United States Patent [19]

Ohta et al.

[11] Patent Number: 5,282,098
[45] Date of Patent: Jan. 25, 1994

[54] CAPSTAN CONTROLLING APPARATUS INCLUDING CAPSTAN, SUPPLY SIDE REEL AND WINDING SIDE REEL ROTATION DETECTORS

[75] Inventors: Yutaka Ohta, Hirakata; Takao Kashiro, Moriguchi; Kenjirou Nakamura, Kadoma, all of Japan

[73] Assignee: Matsushita Electric Industrial Co., Ltd., Osaka, Japan

[21] Appl. No.: 698,771

[22] Filed: May 13, 1991

[30] Foreign Application Priority Data

May 11, 1990 [JP] Japan ................................ 2-121944
Oct. 23, 1990 [JP] Japan ................................ 2-286731
Feb. 4, 1991 [JP] Japan ................................ 2-13310

[51] Int. Cl.$^5$ ........................................... G11B 15/467
[52] U.S. Cl. ................................ 360/73.04; 360/10.3; 360/73.08
[58] Field of Search .................... 360/10.1, 10.3, 72.01, 360/73.01, 73.04, 73.05, 73.06, 73.07, 73.08, 137

[56] References Cited

U.S. PATENT DOCUMENTS

| Re. 30,939 | 5/1982 | d'Alayer de Costemore d'Arc et al. ............................. 360/72.3 X |
| 4,172,231 | 10/1979 | d'Alayer de Costemore d'Arc et al. ............................. 360/137 X |
| 4,956,730 | 9/1990 | Arai et al. ...................... 360/73.08 X |
| 4,985,786 | 1/1991 | Arai et al. ...................... 360/73.08 X |
| 4,989,112 | 1/1991 | Hamoda ........................... 360/137 |

FOREIGN PATENT DOCUMENTS 0254511 1/1988 European Pat. Off. .
0322119 6/1989 European Pat. Off. .
2730134 2/1978 Fed. Rep. of Germany .
2211651 7/1989 United Kingdom .

OTHER PUBLICATIONS

Patent Abstracts of Japan, vol. 13, No. 57 (P-825) Feb. 9, 1989 & JP-A-63 247 946 (Matsushita) Oct. 14, 1988 * abstract *.
Patent Abstracts of Japan, vol. 9, No. 170 (P-373) Jul. 16, 1985 & JP-A-60 045 965 (Hitachi) Mar. 12, 1985 * abstract *.

Primary Examiner—Edward P. Westin
Assistant Examiner—John R. Lee
Attorney, Agent, or Firm—Wenderoth, Lind & Ponack

[57] ABSTRACT

A first frequency generator generates a first rotation detecting signal having a period which varies in accordance with a rotating speed of a capstan. Second and third frequency generators generate respective second and third rotation detecting signals having periods which vary in accordance with a rotating speed of a supply side reel and a winding side reel. A capstan speed comparison circuit generates an error in accordance with the periods of the first, second and third detecting signals and associated reference periods. A capstan drive circuit is controlled in accordance with the thus generated error.

4 Claims, 19 Drawing Sheets

CAPSTAN CONTROLLING APPARATUS INCLUDING CAPSTAN, SUPPLY SIDE REEL AND WINDING SIDE REEL ROTATION DETECTORS

BACKGROUND OF THE INVENTION

In recent years, efforts have been made to shorten the fast forwarding and rewinding times (FF/REW of a video tape device, and to shorten the image reproduction time during fast forward and rewinding modes.

The present invention relates to capstan control which makes it possible to transfer a tape at high speeds and to picture signal processing which makes it possible to reproduce the tape images during high speed tape running operations.

The speed controlling operation of the capstan which is accompanied through the higher speed of the FF/REW will be described hereinafter.

FIG. 1 is a block diagram showing the construction of the conventional rotary head type magnetic record reproducing apparatus such as servo mechanism of a VTR. In FIG. 1, a cylinder control apparatus is composed of a cylinder motor 1 having a rotary head (not shown), a first frequency generator 14 for detecting the rotation speed of the cylinder motor 1, a phase detector 15 for detecting the rotation phase of the cylinder motor 1, a cylinder speed comparing circuit 20 for detecting the errors with respect to the reference period of the output signal of the first frequency generator 14, a reference signal generator 24, a cylinder phase comparing circuit 21 for detecting the phase errors between the rotation phase signals to be obtained by the phase detector 15 and the reproducing reference signals to be obtained from the reference signal generator 24, a first adder 22 for mixing the phase error output of the cylinder phase comparing circuit 21 and the speed error output of the cylinder speed comparing circuit 20, and a cylinder driving circuit 23 which is controlled by the output of the first adder 22 so as to drive the cylinder motor 1.

A capstan control apparatus is composed of a capstan 3 which comes into pressure contact against the pinch roller 4 with a magnetic tape 7 being grasped therebetween to transfer the magnetic tape 7, a capstan motor 2 for driving the capstan 3, a second frequency generator 16 for detecting the rotation speed of the capstan motor 2, a control head 8 for recording and reproducing the control signals on the lower end of the magnetic tape 7, a capstan speed comparing circuit 25' for detecting the error with respect to the reference period of the output signal of the second frequency generator 16, a tracking shifting circuit 29 to be triggered by the output signals of the reference signal generator 24, a capstan phase comparing circuit 26 for detecting the phase errors between the reproducing control signal to be obtained from the control head 8 and the output signal of the tracking shifting circuit 29, a second adder for mixing the phase error output of the capstan phase comparing circuit 26 with the speed error output of the capstan speed comparing circuit 25', and a capstan driving circuit 28 which is controlled by the output of the second adder 27 so as to drive the capstan motor 2.

A magnetic tape driving apparatus is composed of a center pulley 9 to be rotated and driven through a belting 10 by a capstan motor 2, a supply side reel 5 and a winding side reel 6 with the magnetic tape 7 being wound around them, a supply side reel gear 12 and a winding side reel gear 13 for driving the respective reels, an idler 11 for transferring to either the supply side reel gear 12 or the winding side reel gear 13 the rotation of the center pulley 9 in accordance with the running direction of the magnetic tape 7.

The normal reproduction operation of the VTR constructed hereinabove will be simply described with reference to the block diagram of FIG. 1 and the timing chart shown in the FIG. 2.

Reference character S1 of FIG. 2 is the output waveform of a reference signal generator 24 of FIG. 1. The signal is fed into the cylinder phase comparing circuit 21 and a tracking shifting circuit 29 as the reference signal at the reproduction time of the VTR. The trapezoidal wave signal S2 of FIG. 2 is of an internal waveform of the cylinder phase comparing circuit 21, is a phase reference signal of the cylinder motor 1 triggered by the rising edge reference signal of the S1 of FIG. 2, is sampled by the falling edge of the rotation phase signal to be obtained from the phase detector 15, namely, by the falling edge of the signal S3 of FIG. 2, is fed to the cylinder driving circuit 23 with the phase error signal (not shown) of the held cylinder motor 1 and the speed error signal to be obtained from the cylinder speed comparing circuit 20 being mixed by a first adder 22. Accordingly, the cylinder motor 1 is rotated in the phase synchronous relation with the reference signal S1 of FIG. 2. The signal S4 of FIG. 2 is of the output waveform of the tracking shifting circuit 29. The trapezoidal wave signal S5 of FIG. 2 is of an internal waveform of the capstan phase comparing circuit 26, is a phase reference signal of the capstan motor triggered by the falling edge of the output signal S4 of the tracking shifting circuit 29, is sampled by the rising edge of the reproducing control signal to be obtained from the control head 8, namely, by the rising edge of the S6 signal of FIG. 2, is fed into the capstan driving circuit 28 with the phase error signal (not shown) of the held cylinder motor 2 being mixed by the second adder 27 with the speed error signal to be obtained from the capstan speed comparing circuit 25'. The capstan motor 2 is rotated in the phase synchronous relation with the output signal of the tracking shifting circuit 29 of the S4 of FIG. 2 with the reference signal of the S1 of FIG. 2 being shifted in phase. The capstan motor 2 is rotated in the phase synchronous relation with the output signal of the tracking shifting circuit 29 with the reference signal S1 of FIG. 2 being shifted in phase. At the normal reproducing time of the VTR, the rotation head (not shown) mounted on the cylinder motor 1 and the reproduction control signal (FIG. 2, S6) are put into the phase synchronous relation, so that the rotation head is adapted to optimally follow the track recorded on the magnetic tape 7.

The rotation of the capstan motor 2 is transferred into the center pulley 9 through the belt 10, is transferred into the winding side reel gear 13 at the normal reproducing time by an idler 11 to clockwise rotate the winding side reel 6 for winding up the magnetic tape 7, retaining the proper tension. At the time of the reverse reproduction of the review reproduction, the idler 11 falls onto the left-hand side to counterclockwise rotate the supply side reel 5, and winds up the tape with the tension of the magnetic tape 7 being retained so that the magnetic head (not shown) may properly trace the track recorded on the magnetic tape 7.

In order to forward wind the magnetic tape 7 at high speeds (hereinafter referred to as FF mode) or to rewind (hereinafter referred to as REW mode) it, the pinch roller 4 of FIG. 1 is isolated from the capstan 3 and winds the magnetic tape 7 with the constant speed rotation of the capstan motor 2 at high speeds. In this case, the capstan phase comparing circuit 26 is made ineffective, the capstan motor 2 is controlled in speed with the capstan speed comparing circuit 25' only.

The block diagram showing the inner construction of the capstan speed comparing circuit 25' in the conventional VTR of FIG. 1 is shown in FIG. 3. In FIG. 3, it is composed of a first counter 31 for counting the clock pulses (which are represented as CLK in FIG. 3), a first register 30 for fetching the digital outputs, a first timing generator 34 for outputting the various types of timing pulses in synchronous relation with the above described clock pulses in accordance with the rotation detecting signal (which is represented as CAFG in FIG. 3) which changes in period in accordance with the rotation speed of the capstan motor 2, an AND gate circuit 35 for masking the above described clock pulses, and a first data register 33 for feeding the digital initial value with respect to the first counter 31.

The operation of the capstan speed comparing circuit 25' constructed hereinabove will be simply described with reference to block diagram of FIG. 3 and the timing chart of the major essential portions shown in FIG. 4. The reference character A of FIG. 4 is a clock pulse to be inputted from the terminal 50 of FIG. 3, is a basic unit of a clock signal of the first counter 31, namely, the reference speed, is also a synchronizing signal of the above described various types of timing pulses. The reference character B of FIG. 4 is a rotation detecting signal to be inputted from the terminal 51 of FIG. 3, is inputted into the first timing generator 34 so as to compose the clock gate pulses C of FIG. 4, the latch pulses D of FIG. 4, and the preset pulses of E of FIG. 4. The digital initial value accommodated in the first data register 33 is preset in the first counter 31 with the preset pulse E. Immediately after it, the clock pulse A cut off in the AND gate circuit 35 by the clock gate pulse C is fed into the first counter 31. The first counter 31 starts its counting operation. The analog data F shows the counting operation so as to fetch the digital values of the first counter 31 into the first register 30 by the latch pulse D to be generated by the arriving of the next rotation detecting signal B. The clock gate pulse C is adapted to stop the digital operation of the first counter 31 to retain the stable operation when the digital initial value is preset in the first counter 31 and when the digital value of the first counter 31 is fetched into the first register 30. The data F fetched into the first register 30 are converted from the digital into analog, and are outputted. In order to make the operation point in the steady condition constant, the digital initial value (which is assumed to be NPO) to be accommodated in the first data register 33 so that the digital value to be fetched into the first register 30 may become a given value (which is assumed to be NF) when the capstan motor 2 is rotating at a set speed. Assume that the reference period of the rotation detecting signal B of the capstan motor 2 is To and the frequency of the clock pulse A is fck, and the digital initial value NPO is obtained in the follow formula.

$$NPO = NF - fck \cdot To \qquad (1)$$

In order to switch the set of the rotating member, the digital initial value NPO accommodated in the first data register 33 is changed or the rotation detecting signal B to be inputted into the timing generator 34 is divided in frequency to effect the inputting operation.

The problem in the above described construction is that the tape speed is changed in accordance with the tape winding diameter of the reel as the capstan motor 2 is controlled at speed in the capstan speed comparing circuit 25' only in the FF/REW mode for winding and rewinding the magnetic tape at high speeds. As the rotation speed of the capstan motor 2 is constant, the rotation speed of the winding side reel 6 in, for example, FF mode becomes constant. The more the tape is wound, the bigger the winding diameter becomes. The peripheral speed, namely, the tape speed increases, so that the speed of the tape trailing end become maximum. In order to prevent tape damage at the stop time of the tape trailing end, a certain limit value is provided in the maximum speed. It cannot be set in the tape speed beyond it, namely, the capstan speed. Therefore, there is a problem in that the FF/REW time cannot be shortened.

The image reproducing operation at the high speed time will be described hereinafter.

In order to effect the high speed running operation with the tape being fully loaded on the rotation cylinder in the conventional video tape recorder, the vertical and horizontal frequencies of the reproducing signal change by the running speed of the magnetic tape and the rotation speed of the cylinder. Therefore, up to a certain tape speed, the reproducing signal may be imaged on the picture face with the synchronizing signal being separated in the processing portion of the reproducing signal. Once it is beyond a certain speed, the synchronous separation cannot be effected. The vertical or horizontal flowing is caused on the picture face, so that normal images cannot be seen. Namely, in the conventional video tape recorder as shown in FIG. 1, the horizontal frequency of the reproducing signal changes when the rotary cylinder is rotated at almost the same speed as the normal reproducing operation at the high speed running operation of the magnetic tape 7. When the speed correction is effected so that the relative speed of the rotary cylinder 1 and the magnetic tape 7 may become the given frequency in the horizontal frequency as in the special reproducing operation at this time, the vertical frequency changes. If the reproducing signal is imaged as it is on the television image receiving machine, the vertical or the horizontal flowing is caused on the image, with a problem arising in that the reproducing operation cannot be effected on the normal picture face.

In the conventional video recorder, discriminating operation is effected as to which head output from each head output is larger in the fast forwarding reproduction and rewinding reproduction so as to switch the head. As the speed of the tape becomes faster, the head switching signal is generated from the head output. The optimum head output cannot be obtained due to the time delay required to actually switch the head.

FIG. 5 is a block diagram showing the construction from the head output of the conventional video tape recorder to the head switching operation. In the drawing, a rotary head L'101, a rotary head R'102, a rotary head L103, and a rotary head R104 are mounted in the symmetrical positions of the rotary, cylinder 105. The rotary head L'101 and the rotary head L103 are adjacent each other, and the R'102 and the head R104 are adjacent each other. The rotary head L'101 is connected with a head amplifier L'106. The rotary head R'102 is connected with a head amplifier R'107. The rotary head L103 is connected with a head amplifier L108. The rotary head R104 is connected with a head amplifier R109. A head amplifier L'106 and a head amplifier R'107 are connected with a head SW circuit 110. The head amplifier L108 and the head amplifier R109 are connected with a head SW circuit 111. The head SW circuits 110, 111 are connected with a head amplifier SW circuit 113 and an envelope comparing circuit 112, the output signals from the head SW circuits 110, 111 are switched in the head amplifier SW circuit 113 so as to output the amplified signals into a reproduction signal processing circuit 114.

In the waveform forming apparatus of a video tape recorder constructed hereinabove, the output signals from the head amplifier L'116 and the head amplifier R'117 are switched by a head SW circuit 110 in the reference reproducing mode so as to output them into the head amplifier SW circuit 113. The head amplifier SW circuit 113 amplifies the output signal from the head SW circuit 110 so as to output it into the reproducing signal processing circuit 114. In the long hour reproduction mode, the output signals from the head amplifier 108 and the head amplifier 109 are switched by the head SW circuit 111 and are outputted into the head amplifier SW circuit 113. The head amplifier SW 113 circuit amplifies the output signal from the head SW circuit 111, which is outputted into the reproduction signal processing circuit 114.

As the rotary head R'102 and the rotary head R104, and the rotary head L'101 and the rotary head L103 are mounted in adjacent relation, the signals from the head amplifier R'107 are outputted from the head SW circuit 110 when the rotary head R'102 and the rotary head R104 trace the magnetic tape, and the signal from the head amplifier R109 is outputted from the head SW circuit 111. The signals from the head amplifier L'106 are outputted from the head SW circuit 110 when the head L'101 and the head L103 trace the magnetic tape, the signals from the head amplifier L108 are outputted from the head SW circuit 111. In the special reproduction, the output signals from the head SW circuits 110, 111 are compared with by an envelop comparing circuit 112 so as to discriminate which head output is larger so as to feed the head output switching signal into the head amplifier SW circuit 113. In the head amplifier SW circuit 113, the signals from the head SW circuits 110, 111 are switched in accordance with the head output switching signal so as to feed them into the reproduction signal processing circuit 114 after the amplification thereof.

In such a conventional video tape recorder, the number of track crossings by the head into one vertically scanning operation increases when the magnetic tape has been caused to effect the high speed running operation, and the increase or decrease of the output from the head becomes intense. The frequency of the head output switching signal from the envelope comparing circuit becomes higher. Thus, the optimum head output cannot be obtained due to the time delay from the comparison of the respective head output amplitude to the actual head switching operation.

SUMMARY OF THE INVENTION

Accordingly, the present invention has been developed with a view to substantially eliminating the above discussed drawbacks inherent in the prior art, and has for its essential object to provide an improved magnetic record reproducing apparatus.

Another important object of the present invention is to provide an improved magnetic record reproducing apparatus, which is capable of effecting higher speed tape transferring operation without causing tape damage, and providing a stable tape running operation even in the tape high speed transfer.

Still another object of the present invention is to provide an improved magnetic record reproducing apparatus, which is adapted to properly fetch the output signals from the head even at the high speed running operation so as to reproduce the normal images on the picture face of a television image receiving machine.

According to the capstan controlling apparatus of the present invention, the rotation speed of the capstan motor is controlled so that the period total or the period square total of the rotation detecting signal of the supply side reel and the winding side reel may become constant, so that in the FF/REW mode for driving the reel with the pinch roller being disengaged, the tape running speed may be made almost constant or the smooth transient response may be realized without a hunting phenomenon being caused in the capstan motor by the stage like modulation of the reference period of the speed comparison.

Also, according to the present invention, the running speed of the magnetic tape is made constant, at the time of fast forwarding reproduction and rewinding reproduction, and the reproduction signal at the various tape speeds may be displayed on the monitor image by the relative speed correction of the rotation speed of the magnetic tape and the cylinder.

Further, according to the present invention, by the equivalent advance of the phase of the head switching signal is effected when the reproducing signal is displayed on the picture face with the magnetic tape being fast forwarded or rewound.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
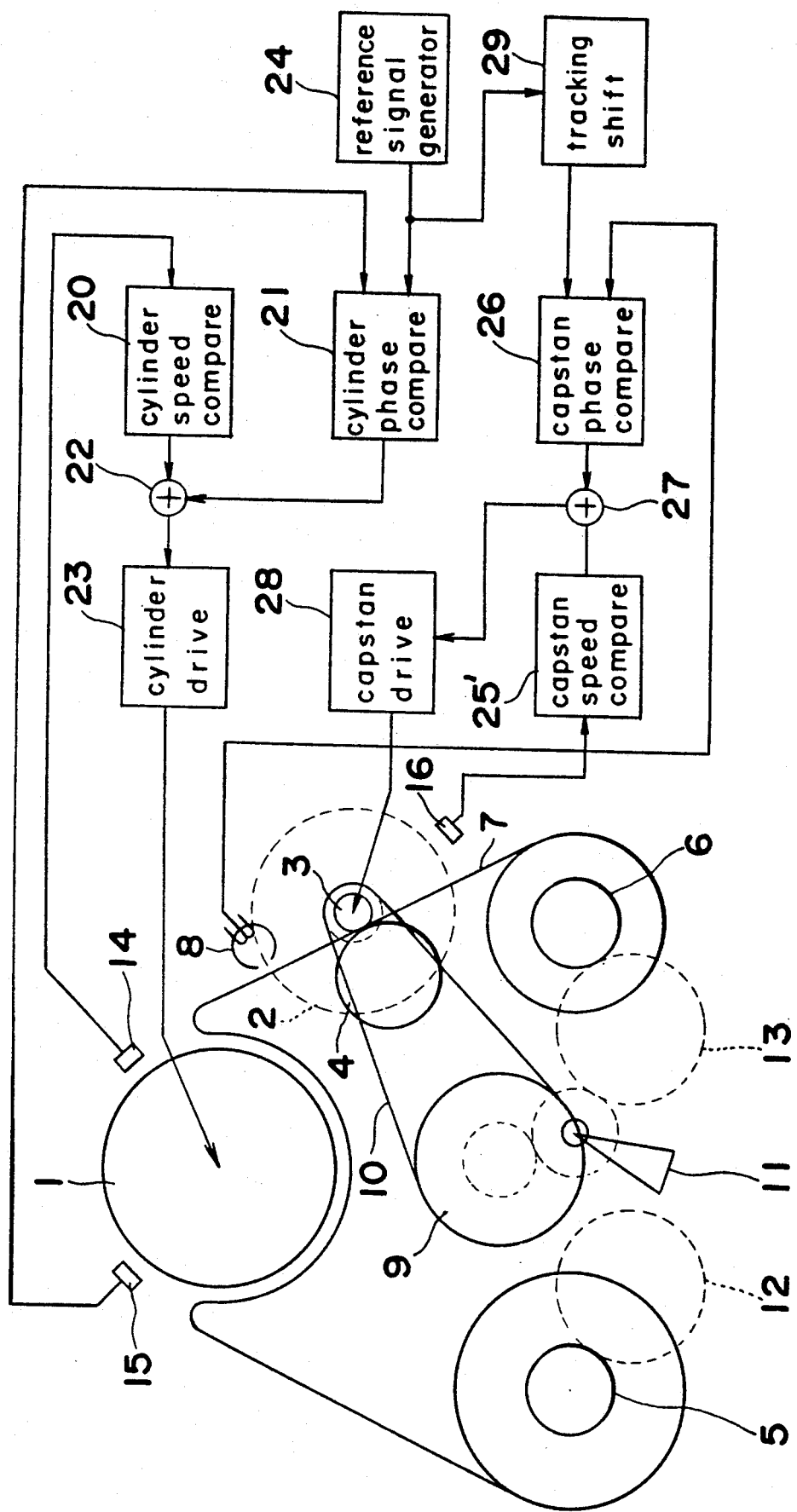
FIG. 1 is a block diagram showing the construction of the conventional VTR servo mechanism.

Before the description of the present invention proceeds, it is to be noted that like parts are designated by like reference numerals throughout the accompanying drawings.

Embodiment 1

Figure 6:
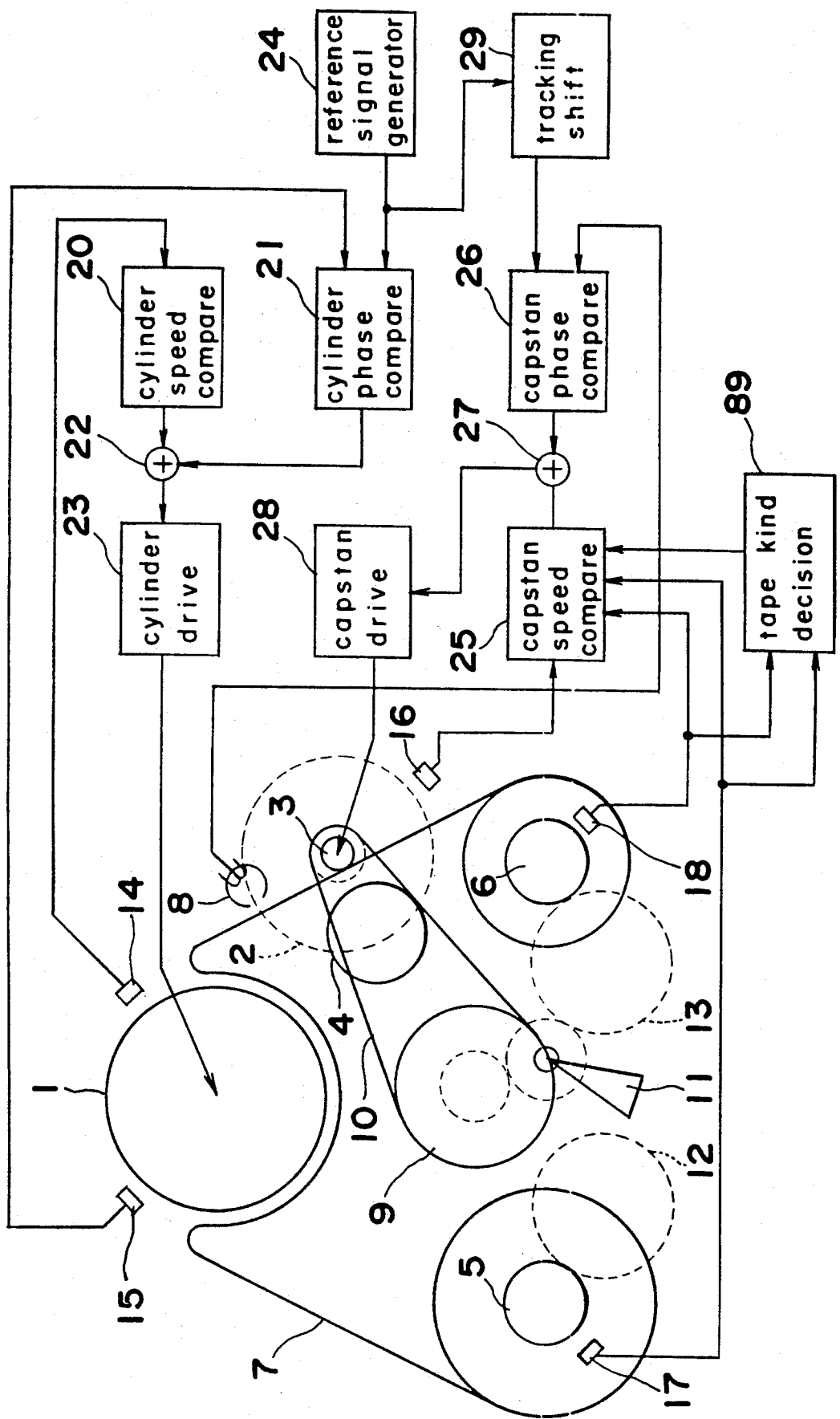
FIG. 6 is a block diagram showing the construction of the VTR servo mechanism using the capstan control apparatus in a first embodiment of the present invention.

FIG. 6 is a block diagram showing the construction of the VTR servo mechanism using the capstan control apparatus in a first embodiment of the present invention. In FIG. 6, in addition to the construction of the conventional example of FIG. 1, a third frequency generator 17 and a fourth frequency generator 18 for detecting the respective rotating speeds of the supply side reel 5 and the winding side reel 6 are added. The respective outputs are adapted to be inputted into a capstan speed comparing circuit 25 and a tape type discriminating circuit 89.

Figure 7:
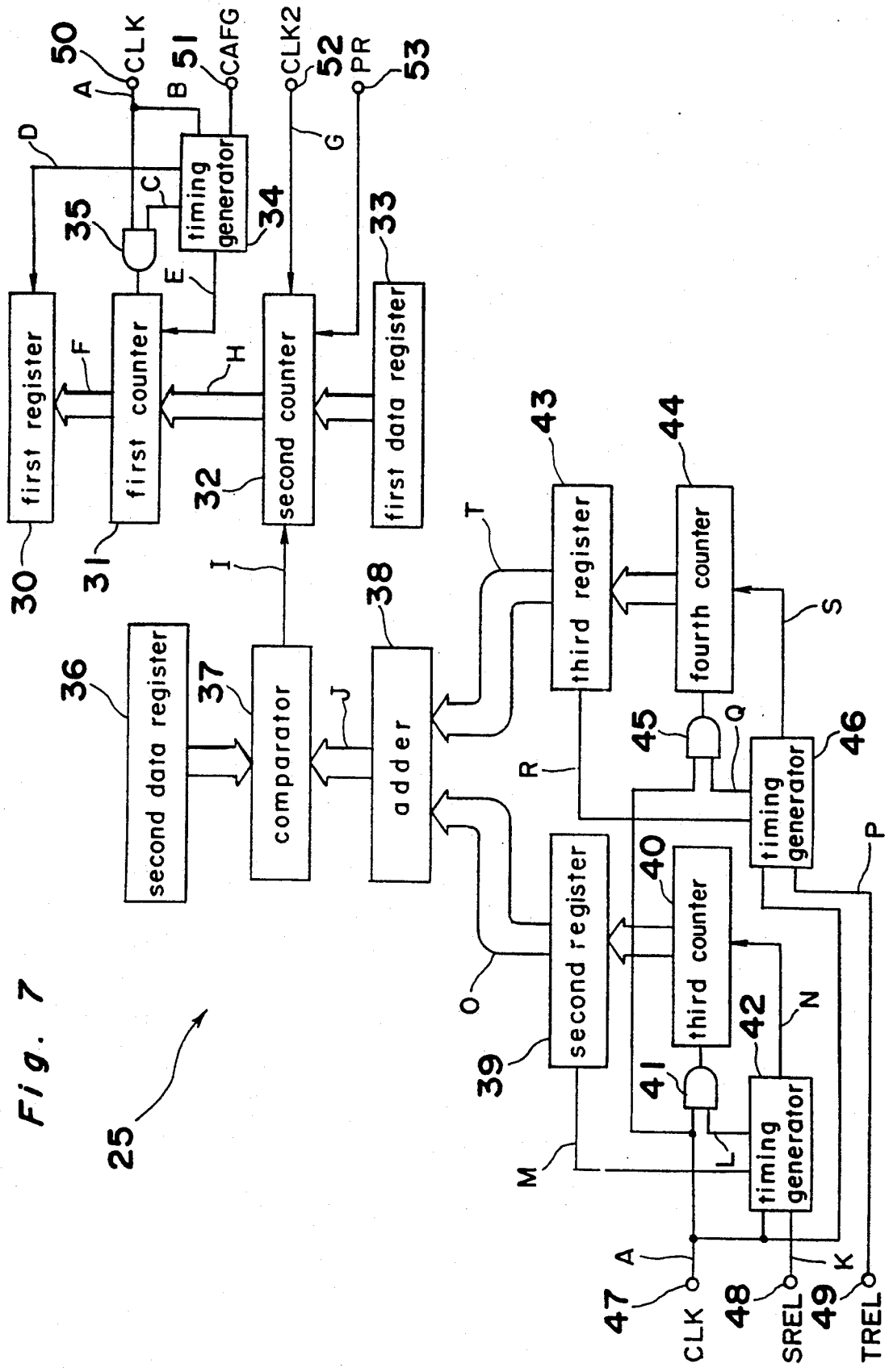
FIG. 7 is a block diagram showing the inner construction of a capstan speed comparing circuit in the capstan control apparatus of FIG. 6.

FIG. 7 is a block diagram showing the inner construction of a capstan speed comparing circuit 25 of FIG. 6. In FIG. 7, in addition to the inner construction of the conventional capstan speed comparing circuit 25, it is composed of a second counter 32 which is adapted to set the output data of the first data register 33 by the preset pulse (in FIG. 7, it is represented by PR) to be inputted from the terminal 53, to count second clock pulses (in FIG. 7, they are represented as CLK2) to be inputted from the terminal 52, and to feed the digital output into a first counter 31, a third counter 40 for counting the clock pulses (in FIG. 7, they are represented as CLK) to be inputted from the terminal 47, a second register 39 for fetching the digital output thereof, a second timing generator 42 which is inputted from a terminal 48, and is adapted to output in synchronous relation with the above described clock pulses the various types of timing pulses in accordance with a rotation detecting signal (in FIG. 7, it is represented as SREL) where the period changes in accordance with the rotation speed of the supply side reel 5, an AND gate circuit 41 for masking the above described clock pulses, a fourth counter 44 for counting the above described clock pulses, a third register 43 for fetching the digital output, a third timing generator 46 which is inputted from a terminal 49, and is adapted to output in the synchronous relation with the above described clock pulse the various types timing pulses in accordance with the rotation detecting signal (in FIG. 7, it is represented as TREL) where the period changes in accordance with the rotation speed of the winding side reel 6, an AND gate circuit 45 for masking the above described clock pulses, an adder 38 for adding the data of a second register 39 and a third register 43, and a comparator 37 for comparing the size between the adding output and the output data of the second data register 36 so as to instruct the counting direction (UP/DOWN) of the second counter 32 in accordance with the results thereof.

The operation of the capstan speed comparing circuit constructed as hereinabove will be described with reference to a block diagram shown in FIG. 7 and a timing chart of the major portions shown in FIG. 8.

Figure 8:
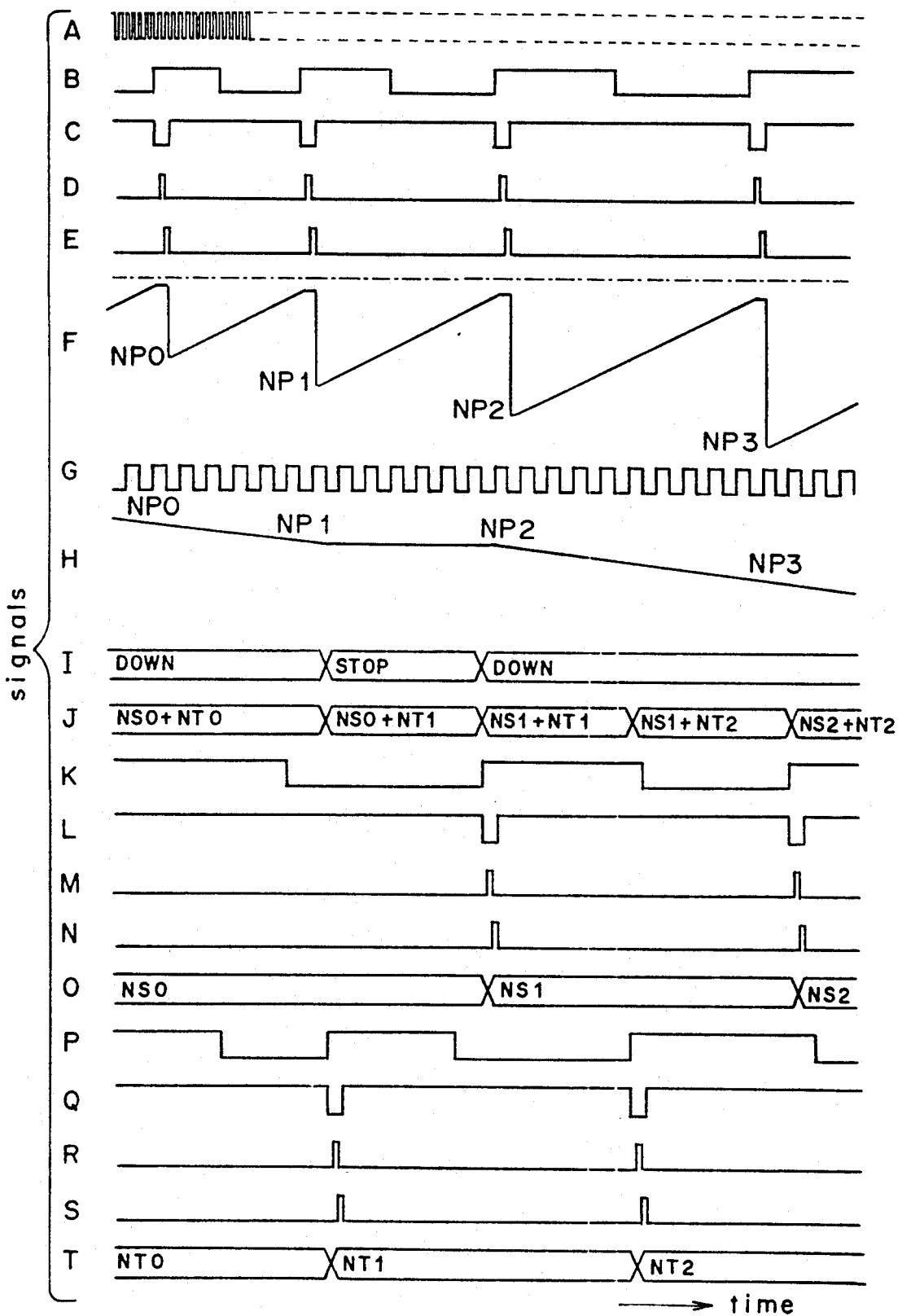
FIG. 8 is a timing chart for illustrating the circuit operation of the capstan speed comparing circuit of FIG. 7.

The signal K of FIG. 8 and the signal P of FIG. 8 are rotation detecting signals of the supply side reel 5 and the winding side reel 6 to be inputted from the terminal 48 and the terminal 49 of FIG. 7, and are inputted respectively into the second and third timing generators 42, 46. The clock gate pulses L and Q of FIG. 8, the latch pulses M and R of FIG. 8, and the reset pulses of N and S of FIG. 8 are composed. Third and fourth counters 40, 44 are reset by reset pulses N, S. Immediately after it, a clock pulse A from a terminal 47 cut off in the AND gate circuits 41, 45 are fed into third and fourth counters 40, 44 with the clock gate pulses L, Q, so that the third and fourth counters 40, 44 start their counting operation. The data O and T of FIG. 8 show the period data which has fetched the digital values of the third and fourth counters 40, 44 into the second and third registers 39, 43 respectively by the latch pulses M, R to be caused by the arriving of the next rotation detecting signals K, P. Here the clock gates pulses L, Q are to stop the digital operation of the counter when the counter is reset and when the digital value of the counter is fetched into the register so as to retain the safe action. The data J of FIG. 8 is a period total data where the period data O, T of the rotation detecting signals of the supply side reel 5 and the winding side reel 6 measured in the above described manner. The signal I of FIG. 8 is a control signal for instructing a counting direction, namely, count up/down/stop with respect to the second counter 32 in accordance with the results of the size comparison between the period total data and the reference period total data accommodated in the second data resister 36. The signal G of FIG. 8 is a clock pulse of the second counter 32 to be inputted from the terminal 52. The signal H of FIG. 8 is a counter output representing the count operation of the second counter 32 in analog. When the above described period total data is smaller than the reference period total by the given value or more, the tape speed is higher than the set speed. Therefore, an instruction of the count down is fed with respect to the second counter 32 so that the second counter 32 counts down the second clock pulse G to be inputted from the terminal 52. When the above described period total data is larger than the reference period total by a given value or more, the tape speed is lower than the set speed. Thereafter, the instruction of the count up is sent with respect to the second counter, so that the second counter 32 counts up the second clock pulse G to be inputted from the terminal 52. When the above described period total data stays within a certain given value of the reference period total, the tape speed is near the set speed. Therefore, the instruction of the count stop is set with respect to the second counter 32, and does not count the second clock pulse G to be inputted from the terminal 52.

Figure 3:
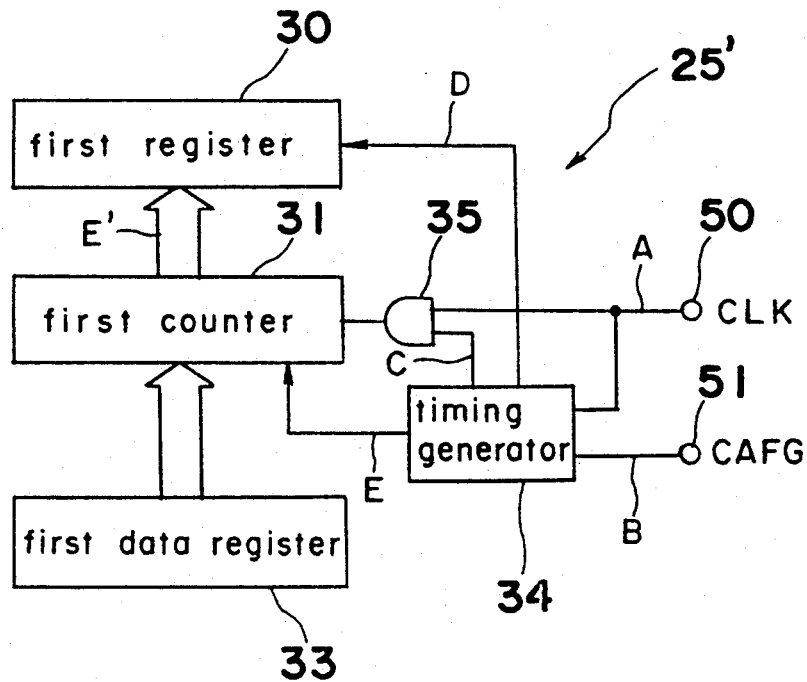
FIG. 3 is a block diagram showing the inner construction of a capstan speed comparing circuit in the conventional VTR servo mechanism of FIG. 2.
Figure 4:
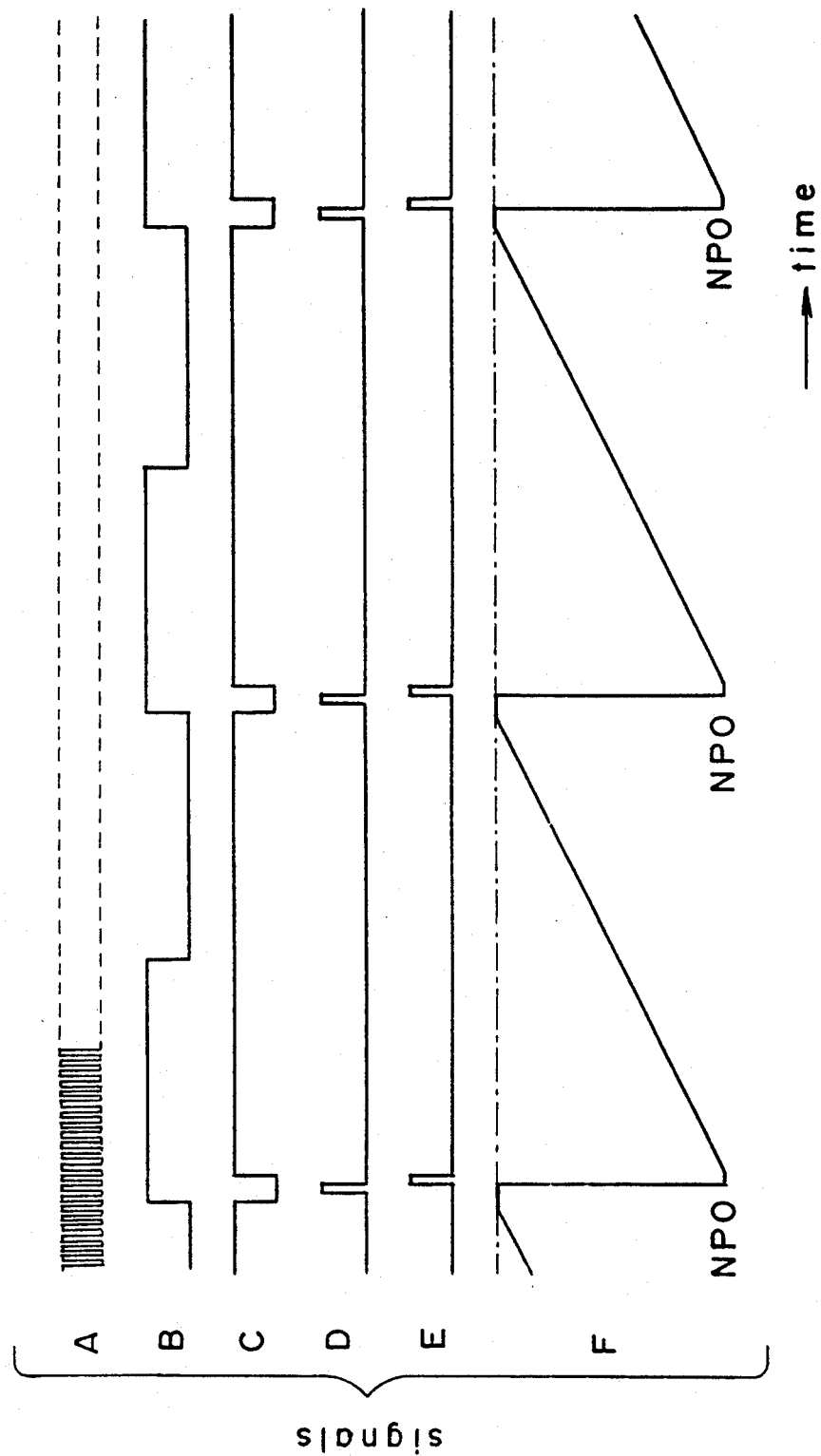
FIG. 4 is a timing chart for illustrating the circuit operation of the conventional capstan speed comparing circuit.
Figure 5:
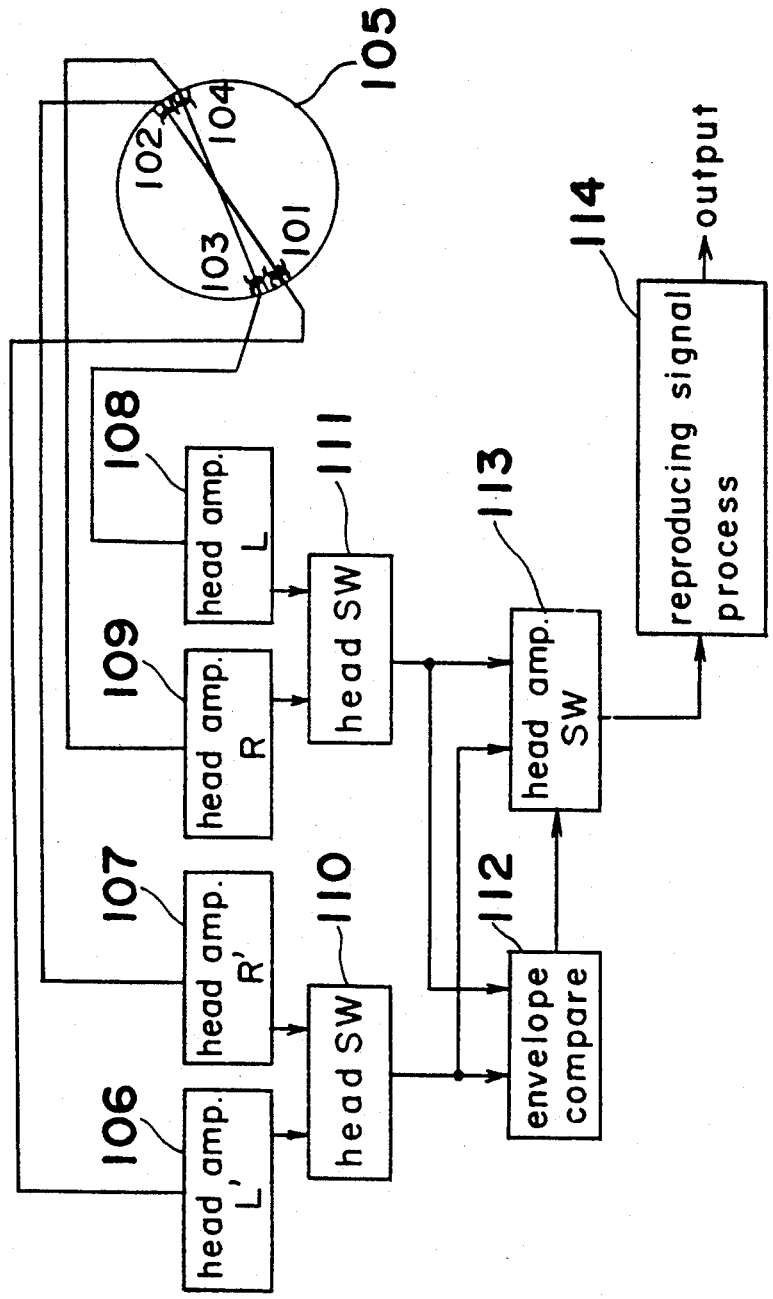
FIG. 5 is a block diagram showing the construction of the head output switching portion of the conventional video tape recorder.

The signal A through the E of FIG. 8 are the same in the timing chart as the signal A through E of FIG. 4 described in the conventional embodiment of FIG. 3. The clock gate pulse C, the latch pulse D and the preset pulse E are composed by the circuit detecting signal B of the above described capstan motor 2 to be inputted from the terminal 51. The signal F of FIG. 8 is a counter output showing in analog the count operation of the counter 31 of FIG. 1. The difference between it and the data F of FIG. 4 is in that the counting initial value to be preset into a first counter 31 becomes the counting value of the second counter 32 each time the rotation detecting NP0→NP1→NP2→NP3 in the case of the present embodiment. As a result, the rotation speed of the capstan motor 2 is reduced smoothly as shown in the signal B of FIG. 8, so that the rotation detecting signal period total of the reels on the supply side and the winding side are retained almost constant, and thus, the tape speed is also controlled constantly. Since the period is constant, $$Ts + Tt = K \quad (2)$$

wherein Ts is a rotation detecting signal period of the supply side reel 5, Tt is a rotation detecting signal period of the winding side reel 6, and K is a period total constant. In the case of, for example, FF mode, the winding side reel 6 is driven by the capstan motor 2. Assume that the capstan motor 2 is rotating at a certain constant speed, and the rotation detecting signal period Tt of the winding side reel 6 becomes also constant, the supply side reel 5 is accelerated as the tape is wound, and the rotation detecting signal period Ts of the supply side reel 6 is reduced. Accordingly, in order to satisfy the relation of the above described formula (2), the rotation detecting signal period Tt of the winding side reel 6 is increased larger. Namely, the capstan motor 2 is decreased. The output data of the above described second data register 36, namely, the reference period total is required to be switched in accordance with the discrimination results by the tape type discriminating circuit 89 of FIG. 6. This is because the tape speed becomes different in accordance with the type of the tape unless the reference period total is varied by the length of the wound tape.

The above described tape type discriminating circuit 89 obtains the tape area by the rotation detecting signal period of both the reels in the tape speed constant condition, such as at the recording time or the normal reproducing time.

Figure 9:
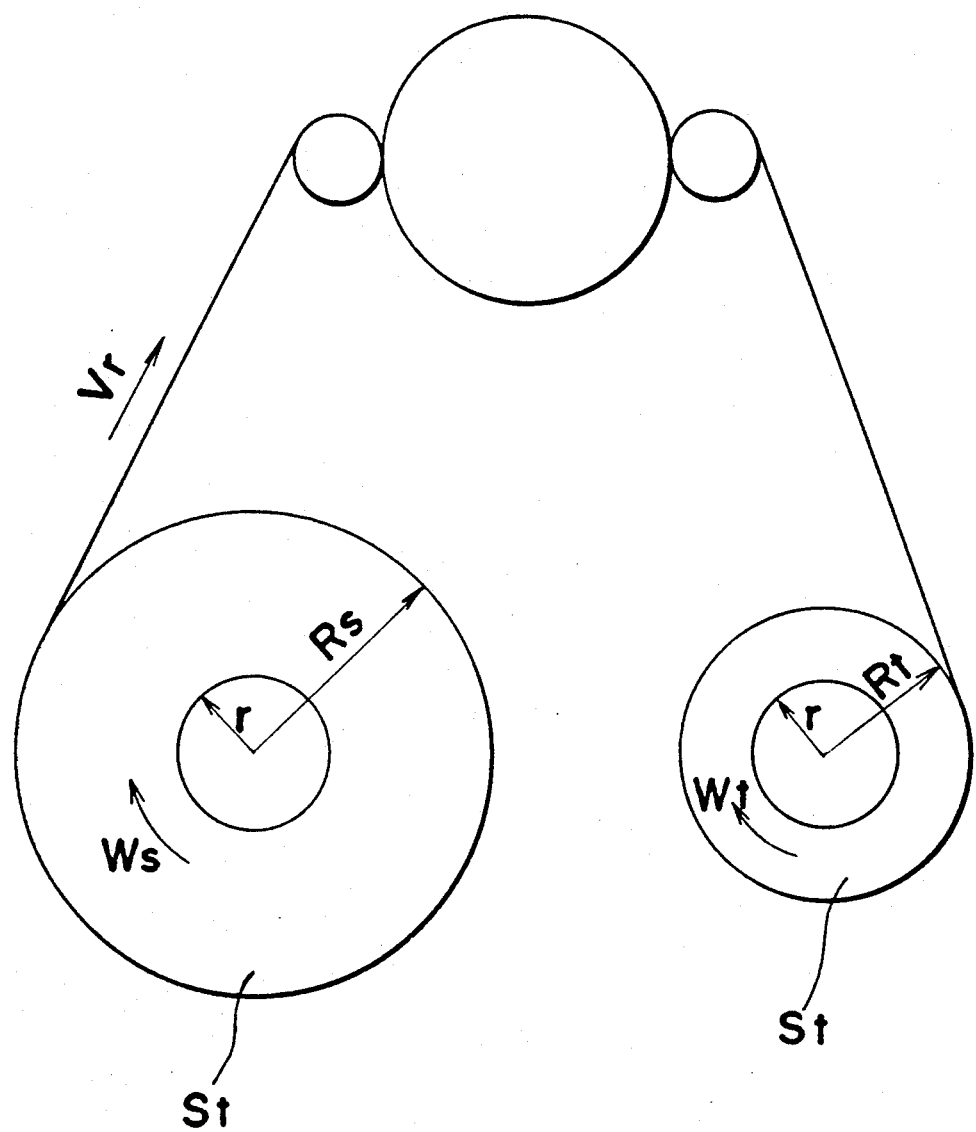
FIG. 9 is a model for illustrating the relation between the tape speed and the reel hub diameter.

FIG. 9 is a model view for illustrating the relation between the tape speed and the reel hub diameter. In the drawing, Vt is a tape speed (m/s), r is a hub diameter (m) of a reel, Rs and Rt show respectively a radius (m) up to the tape outer periphery wound around an S reel and a T reel, Ss and St show the area (m$^2$) including the tape wound around the S reel and the T reel, and the reel hub, Ws and Wt show respectively the rotation angle speed (rad/sec) of the S reel and the T reel.

The angle speeds Ws and Wt may be obtained by the rotation detecting signal periods Ts and Tt of both the reels.

The Rs and the Rt are expressed by the following formula.

$$Rs = Vt/Ws,$$

$$Rt = Vt/Wt$$

Thus, the tape overall area S of the reel hub including the reel hub equivalent to the length of the tape is shown in the following formula.

$$S = Ss + St = \pi(Rs^2 + Rt^2)$$

There are several types in the length of the tape. If the overall area S of the various types of tape is obtained in advance, it can be discriminated how many minutes this tape, which is being wound at present, can be used.

Figure 10:
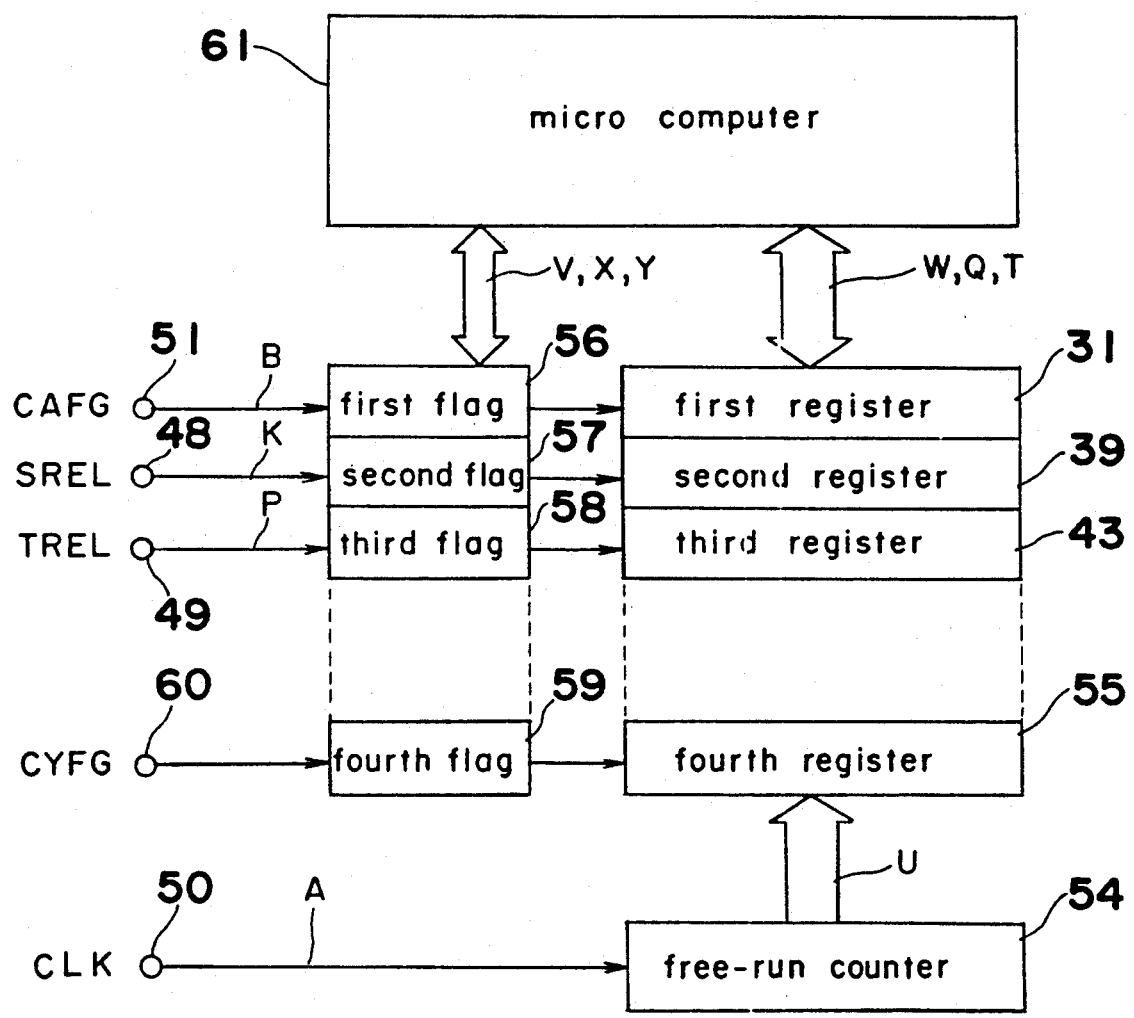
FIG. 10 is a block diagram showing the construction in a case where the capstan control apparatus of the other embodiment of the present invention is realized by the use of the microcomputer.

In recent years, a speed control apparatus of a rotating member by the software servo technique using a microcomputer is proposed. FIG. 10 is another embodiment of the present invention showing the construction where the input capturing circuit of the above described various types of rotation detecting signal is added into the microcomputer.

In FIG. 10, it is composed of a microcomputer 61, a freerun counter 54 for counting the clock pulses to be inputted from the terminal 50, a first flag 56, a second flag 57, a third flag 58, . . . , a fourth flag 59 showing that the various types of rotation detecting signals to be inputted from the terminals 51, 48, 49, . . . , 60 have been inputted, a first register 30, a second register 39, a third register 43, a fourth register 55 for fetching the count values of the freerun counter 54 when the above described respective types of rotation detecting signals have been inputted. The first register 30, the second register 39, and the third register 43 are respectively the same as the registers in the embodiment of FIG. 7. What are inputted from the terminal 60 are, for example, the rotation speed detecting signals of the above described cylinder motor 1, the rotation phase signals or the above described reproduction control signals, and are required in a case where the servo function of the whole VTR is realized by the microcomputer 61 although the description thereof is omitted in the present embodiment.

Figure 11:
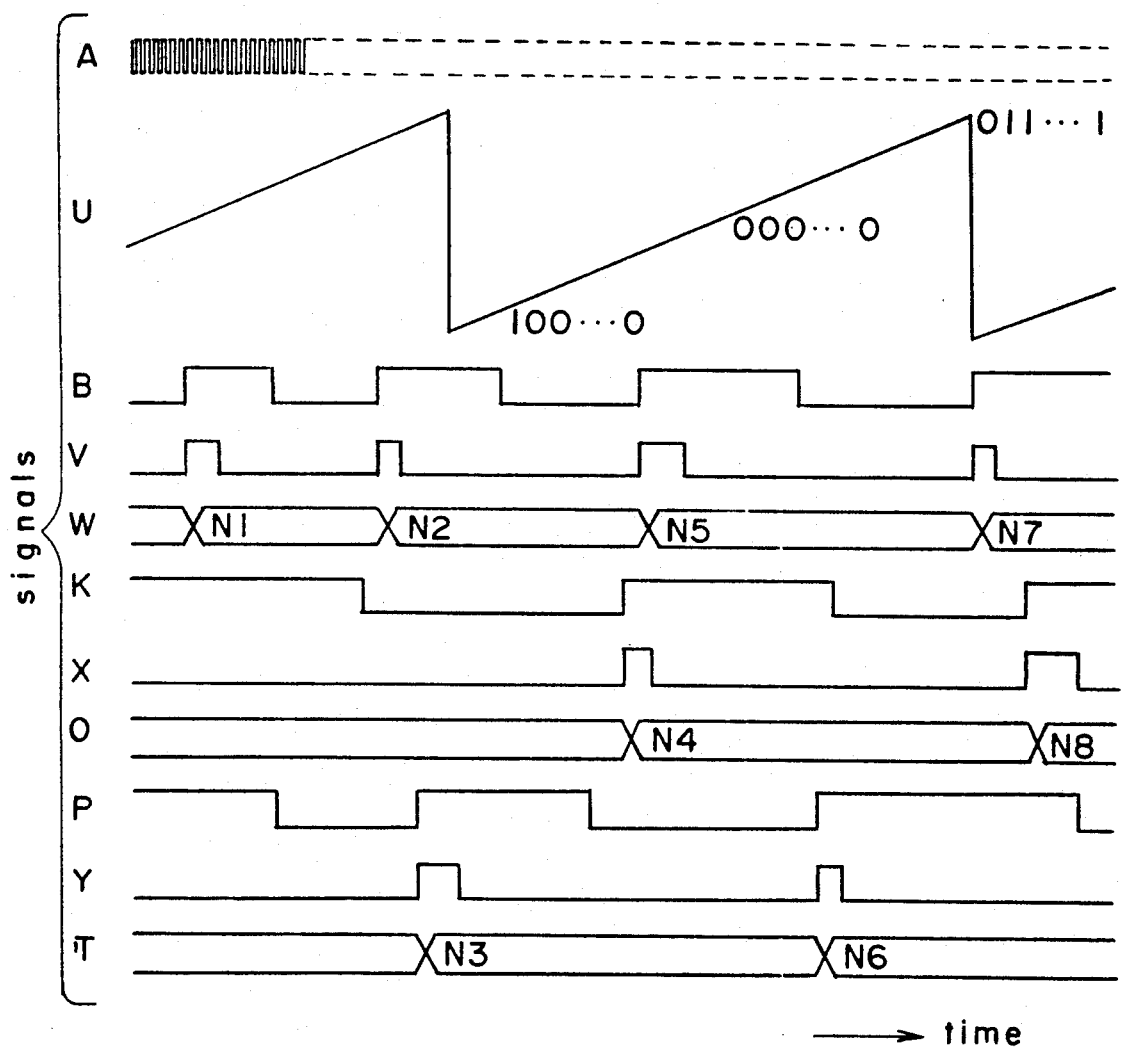
FIG. 11 is a timing chart for illustrating the circuit operation of the capstan control apparatus of FIG. 10.

FIG. 11 is a timing chart of the major portions of FIG. 10. The operation of FIG. 10 will be described with the use of FIG. 11. The signal A of FIG. 11 is inputted from the terminal 50, and is clock pulses to be counted by the freerun counter 54. U of FIG. 11 shows the counting operation of the freerun counter 54, and is represented in analog. The signals B, K, P of FIG. 11 are respectively the rotation detecting signals of the capstan motor 2, the supply side reel and 5, the winding side reel 6 to be inputted from the terminals 51, 48, 49.

The signals v, X, Y of FIG. 11 are the output signals of the first flag 56, the second flag 57, and the third flag 58. They are set by the rising edges of the above described each rotation detecting signal B, K, P and are reset by the software program (to be described later) built in in the microcomputer 61. The data W, O, T of FIG. 11 are the period data to be outputted from the first register 30, the second register 39, and the third register 43 which have fetched the digital values of the freerun counter 54 when the rising edges of the respective rotation detecting signals B, K, P have been inputted. In order to measure the rotation detecting signal period, it can be obtained by the calculation of the difference through the comparison with respect to the period data at the previous edge arriving time by the software program (to be described later) built in the microcomputer 61.

Figure 12A:
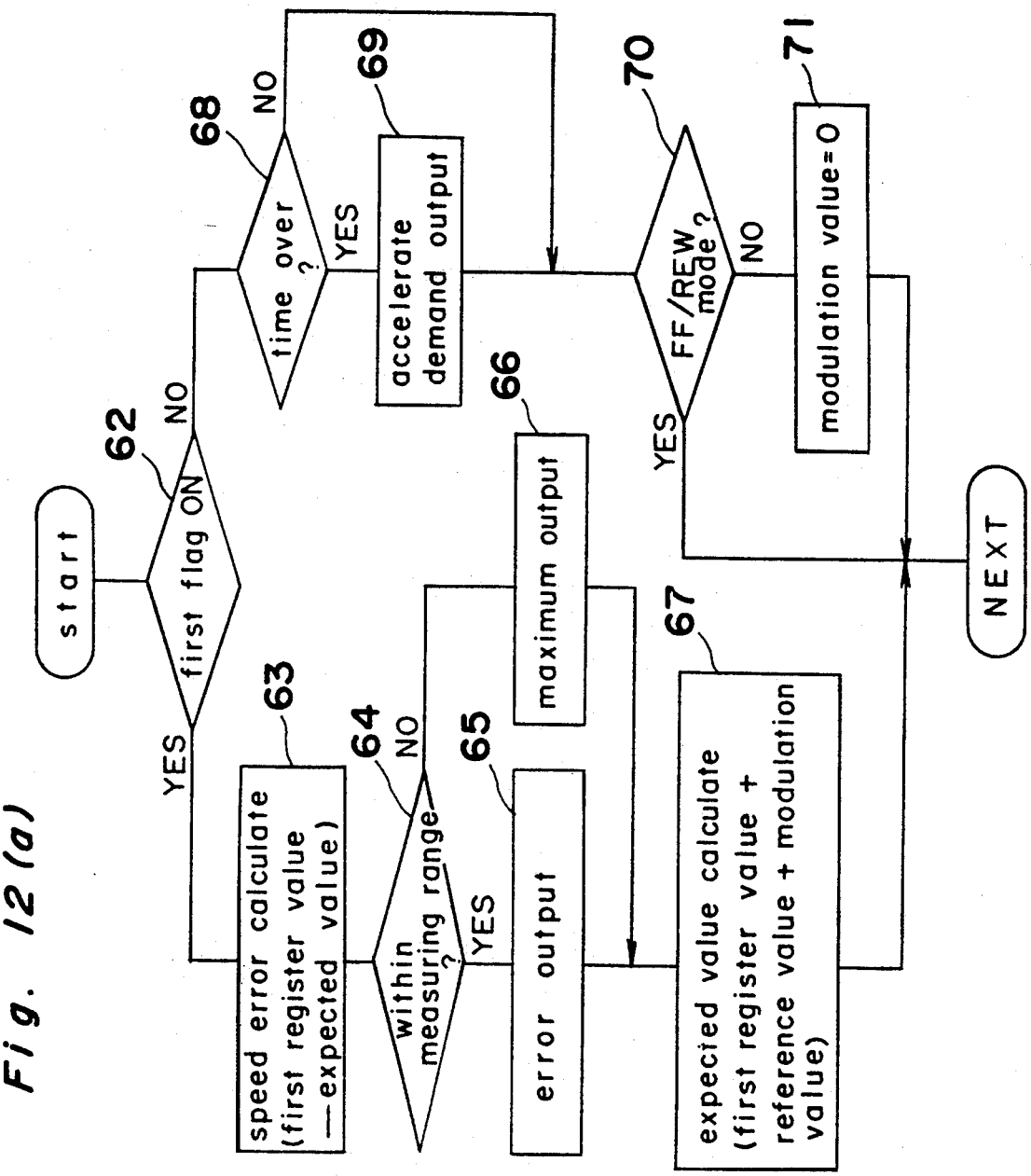
FIG. 12 (a), 12 (b) are flow charts of the software mounted on the microcomputer in the capstan control apparatus of FIG. 10.
Figure 12B:
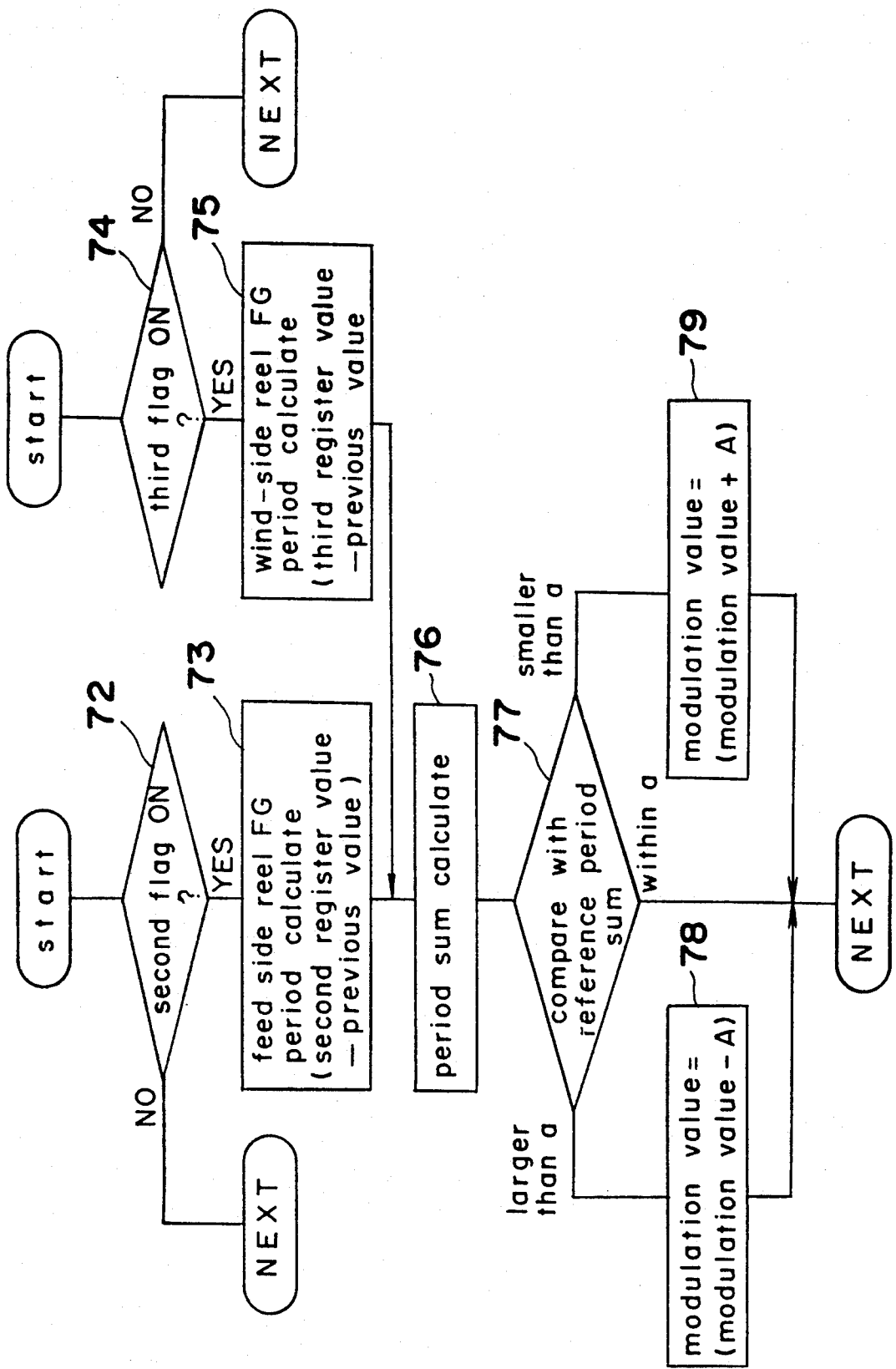

FIGS. 12 (a), (b) are flow charts in a case where the present invention has been realized by the software program built in in the microcomputer 61.

Three starts of the flow charts of FIG. 12 (a), (b) are sub-routine processing starts by the flag sense in the interrupt processing by the set of the first flag 56, the second flag 57, and the third flag 58 of FIG. 10 or in the main processing.

The branch 62 of FIG. 12 (a) discriminates whether or not the rotation detecting signal B of the capstan motor 2 has reached by the output condition of the first flag 56 of FIG. 10. If it has reached, it moves to the processing block 63 so as to effect the speed error computing operation. The speed error computing operation obtains the difference between the first register value which is the arriving time of the rotation detecting signal B and the expectation value computed in advance in accordance with the the previous arriving time and the reference period. The above described expectation value will be described later in detail.

Then, it is judged whether or not the speed error obtained in the branch 64 is within the measuring range. If it stays within the measuring range in the processing block 65 or 66, it is outputted as it is. If it stays beyond the measuring range, the maximum or minimum output is outputted. In the processing block 67, the arriving expectation value of the next rotation detecting signal B is computed. It is obtained by the addition of the calculation value equivalent to the reference period and the speed modulating value into the first register value which is the arriving time of the present rotation detecting signal B. If it does not stay in the branch 62, it moves to the branch 68 so as to check whether the rotation detecting signal B does not arrive for the given time or more by the timer (not shown) built in in the microcomputer 61. If the signal does not arrive, the acceleration instructions are outputted in the processing block 69 so as to solve the problem at the starting time of the capstan motor 2. It is judged whether or not the mode is the FF/REW mode in the branch 70. If the mode is not the FF/REW mode, the above described modulation value is cleared to zero by the processing block 71.

The branch 72 of FIG. 12 (b) discriminates whether or not the rotation detecting signal K of the supply side reel 5 has arrived by the output condition of the second flag 57 of FIG. 10. If the signal has arrived, it moves into the processing block 73 so as to effect the period computing operation of the rotation detecting signal K. Namely, the difference between the second register value which is the arriving time of the rotation detecting signal K and the previous arriving time is obtained. The branch 74 discriminates whether or not the rotation detecting signal P of the winding side reel 6 has arrived by the output condition of the third flag 58 of FIG. 10. If the signal has arrived, it moves to the processing block 75 so as to effect the period computing operation of the rotation detecting signal P. Namely, the difference between the third register value which is the arriving time of the rotation detecting signal P and the previous arriving time is obtained.

The period total of the rotation detecting signals K and P of the supply side reel 5 and the winding side reel 6 is obtained by the processing block 76 so as to effect the size comparison with the reference period total in the branch 77. When the measured period total is larger by a or more than the reference period total, it moves to the processing block 78 so as to subtract the A only from the present modulation value for having it as the new modulation value.

When the measured period total is smaller by a or more than the reference period total, it moves to the processing block 79 so as to add the a only from the present modulation value for having it as the new modulation value. When the measured period total is within the a of the reference period total, the present modulation value is retained.

The same operation as in the capstan control apparatus in the embodiment of the above described FIG. 7 is realized by the above described process.

Figure 2:
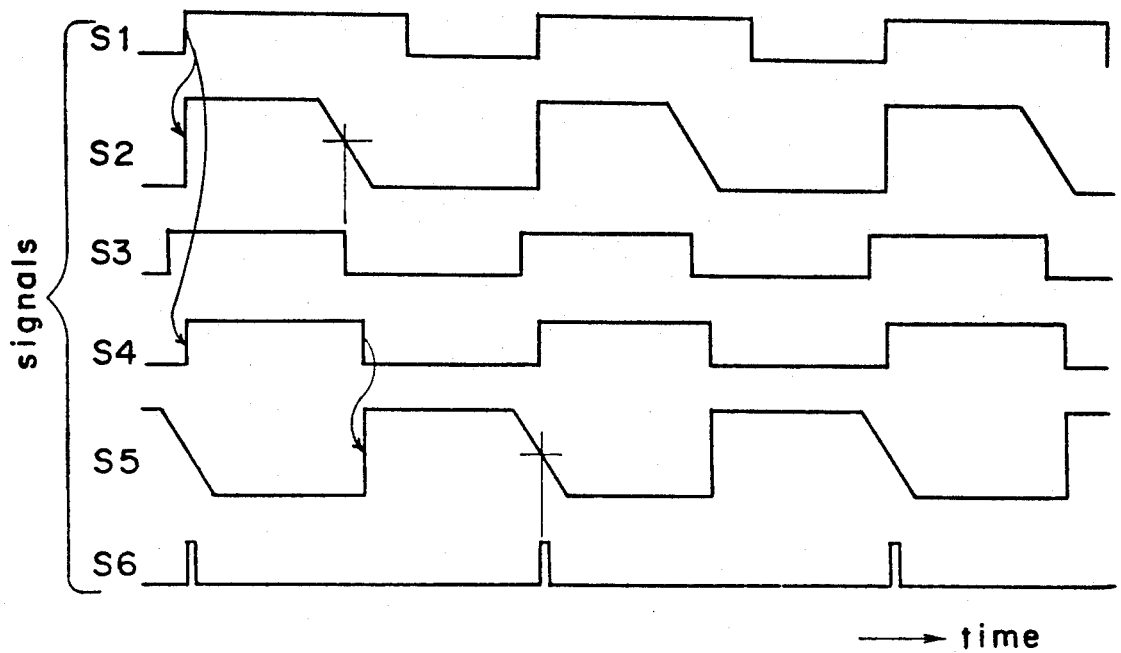
FIG. 2 is a timing chart for illustrating the operation of the conventional VRT servo mechanism of FIG. 1.

Although the number of the pulses of the rotation detecting signals per rotation of both the reels is the same in the present embodiment, the correction thereof is required in accordance with the pulse number ratio when the pulse number is different in the period total computation of the adder 38 of FIG. 2 and the processing block 76 in the flow chart of FIG. 12 (b). Assume that the above described pulse number ratio of the supply side reel 5 and the winding side reel 6 is (m:n), and the above described period total calculation is to become as follows.

$$m \cdot Ts + n \cdot Ti = K \tag{3}$$

Figure 13:
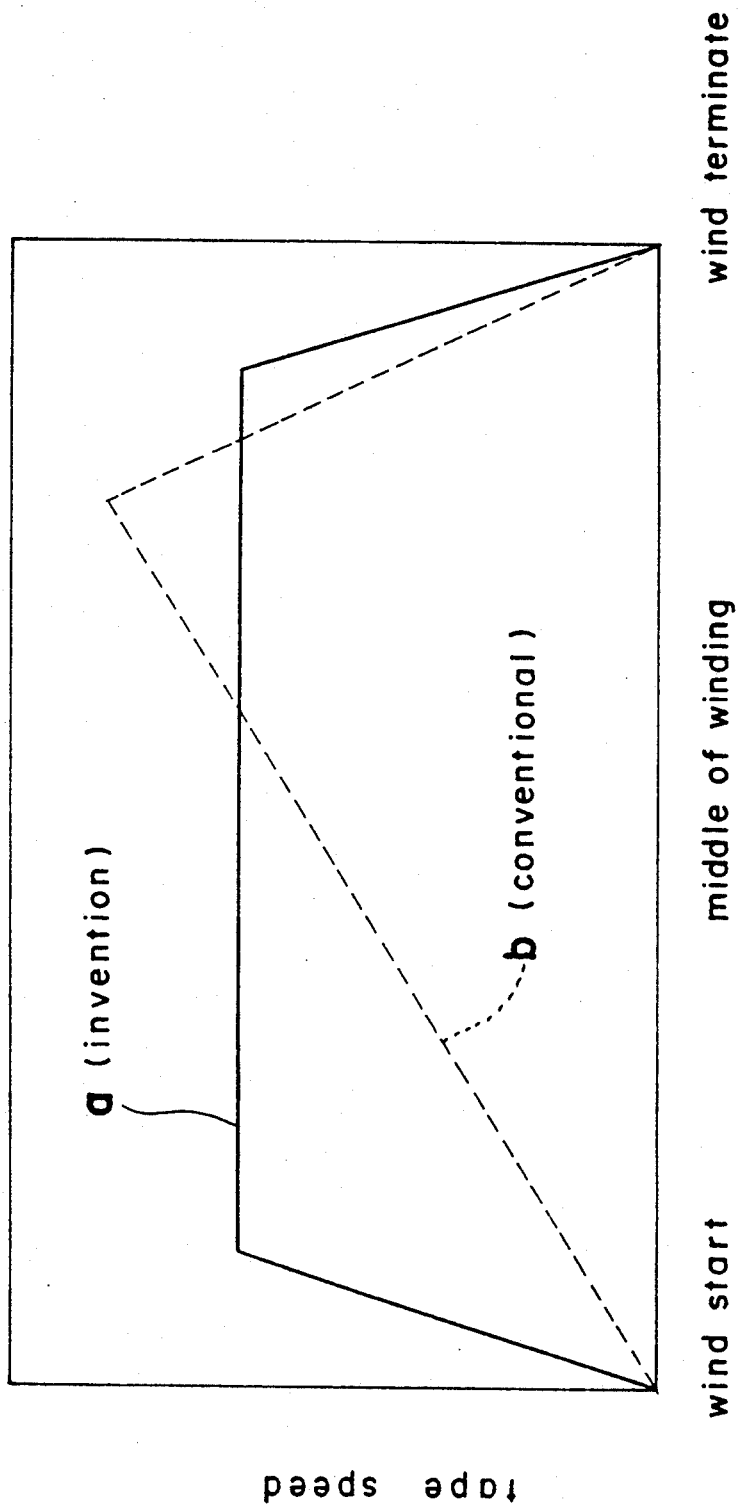
FIG. 13 is a characteristic view showing the relationship between the tape winding diameter and the tape speed in the FF/REW mode of the capstan control apparatus of the present invention and the conventional embodiment.
Figure 14:
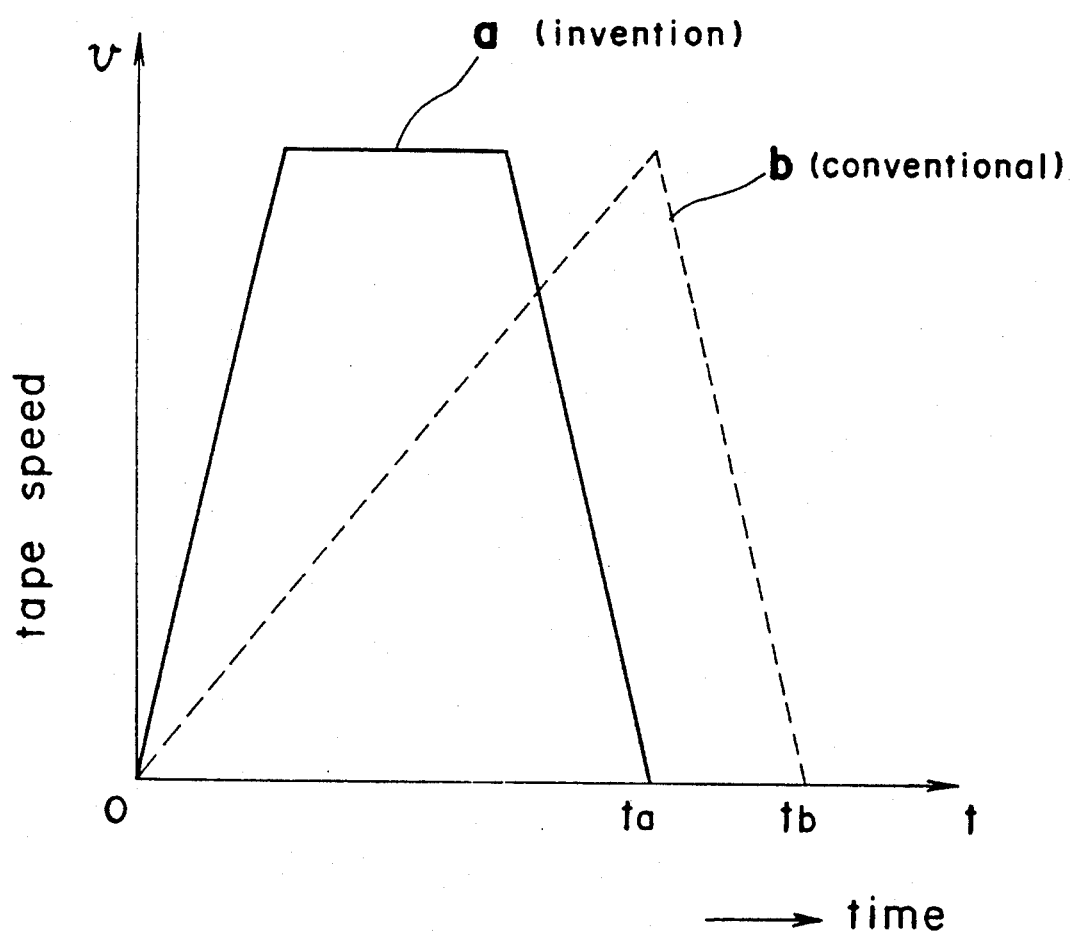
FIG. 14 is a characteristic view showing the relationship between the tape speed and the winding time in the FF/REW mode.

FIG. 13 shows the relationship between the tape winding diameter and the tape speed in the FF/REW mode. The line b of FIG. 13 is that in the conventional capstan control apparatus, where the tape speed increases steadily through the tape winding diameter. In the capstan control apparatus of the present invention of the line a of FIG. 13, the tape speed becomes constant independently of the tape winding diameter. FIG. 14 shows the time changes of the tape speed in the FF/REW. The winding time may be considerably shortened as compared with the conventional embodiment.

Figure 15:
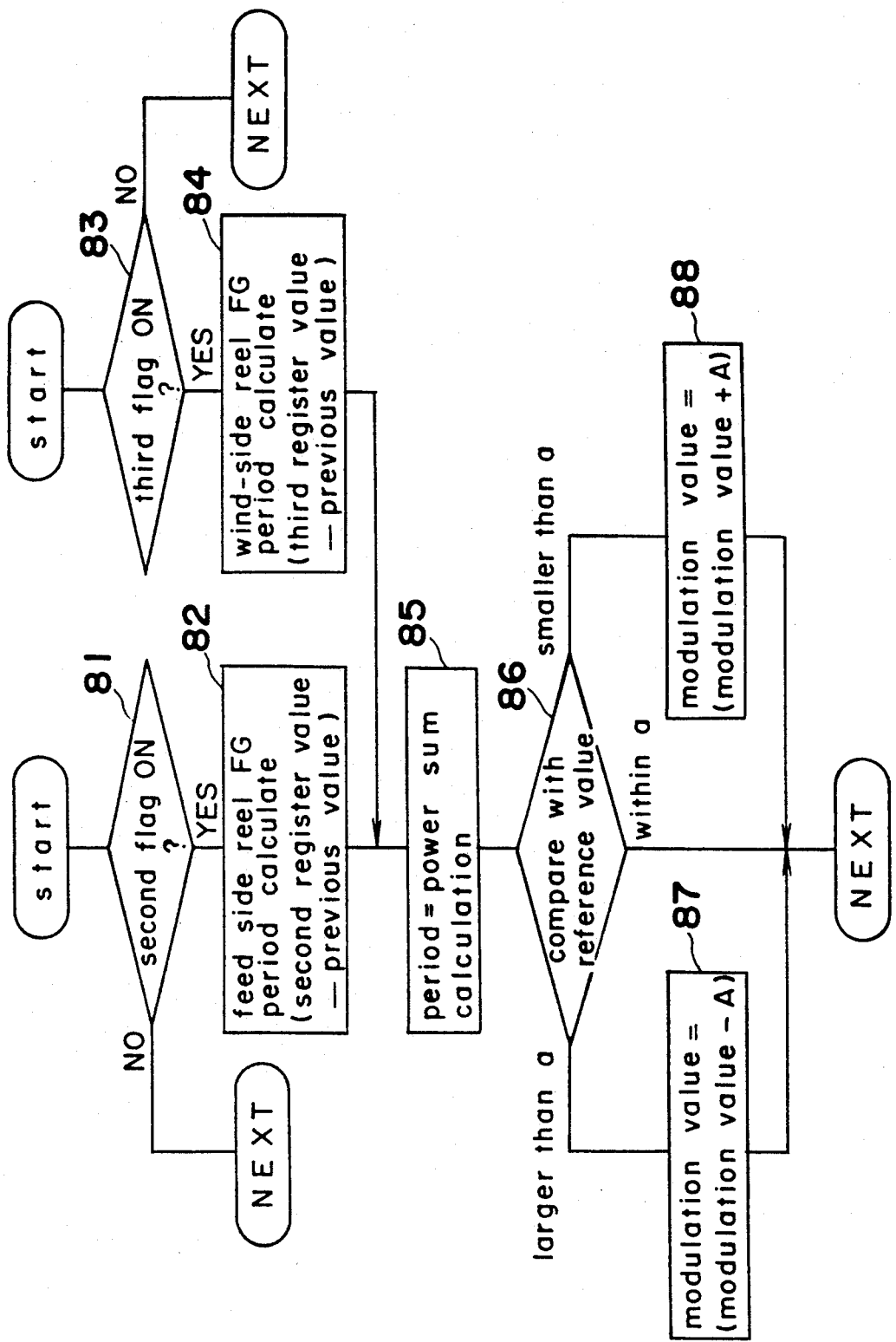
FIG. 15 is a flow chart showing the software essential portions in a case where the capstan control apparatus of the other embodiment of the present invention is realized by the use of the microcomputer.

FIG. 15 is a flow chart showing the essential portions in the other embodiment realized by the software program built in in the microcomputer 61. The starting shows the sub-routine processing starting by the flag sense in the interrupt processing by the sets of the second flag 57, the third flag 58 of FIG. 10 or in the main processing.

In FIG. 15, the branch 81 discriminates whether or not the rotation detecting signal K of the supply side reel 5 has arrived by the output condition of the second flag 57 of FIG. 10. If the signal has arrived, it moves into the processing block 82 so as to effect the period computing operation of the rotation detecting signal K. Namely, the difference between the second register value which is the arriving time of the rotation detecting signal K and the previous arriving time is obtained.

The branch 83 discriminates whether or not the rotation detecting signal P of the winding side reel 6 has arrived by the output condition of the third flag 58 of FIG. 10. If the signal has arrived, it moves to the processing block 84 so as to effect the period computing operation of the rotation detecting signal P. Namely, the difference between the third register value which is the arriving time of the rotation detecting signal P and the previous arriving time is obtained.

The period square total of the rotation detecting signals K and P of the supply side reel 5 and the winding side reel 6 is obtained by the processing block 85 so as to effect the size comparison with the reference value in the branch 86. When the measured period square total is larger by the a or more than the reference value, it moves to the processing block 87 to subtract the A only from the present modulation value for having it as the new modulation value.

When the measured period square total is smaller by the a or more than the reference value, it moves to the processing block 88 so as to add the a only from the present modulation value for having it as the new modulation value. When the measured period square total is within the a of the reference value, the present modulation value is retained.

The above described capstan motor 2 is controlled in speed by the above described software processing so that the square total of the rotation detecting signal period of both the reels may become constant. Namely, since the period square total is constant, $$Ts^2 + Tt^2 = K \tag{4}$$

wherein the rotating detecting signal period of the supply side reel is Ts (1/s), the rotation detecting signal period of the winding side reel is Tt (1/s), and the K is a constant.

$$Rs = V \cdot N \cdot Ts/(2\pi) \tag{5}$$

$$Rt = V \cdot N \cdot Tt/(2\pi) \tag{6}$$

wherein the tape speed is V (m/s), the supply side tape winding diameter is Rs (m),, the winding side tape winding diameter is Rt (m), and N is the pulse number of the rotation detecting signal per rotation in the supply side reel and the winding side reel. When they are respectively substituted into the (4) formula, $$(4\pi/V^2N^2)\cdot(\pi Rs^2 + \pi Rt^2) = K \tag{7}$$

The second parenthesized passage on the left side of the formula (7) shows the whole tape area (which is assumed to be S (m²)) including both the reels, and is constant independently of the tape winding diameter. Accordingly, the tape speed V becomes a constant speed to be obtained by $$V = (4\pi \cdot S/N^2 \cdot K)^{\frac{1}{2}} \tag{8}$$

In the present embodiment, the pulse number of the rotation detecting signal per rotation of both the reels is necessary. If it is different, the correction is necessary in the period square calculation of the processing block 85 in the flow chart of FIG. 15 in accordance with the pulse number ratio. For example. if the above described pulse number ratio between the supply side reel 5 and the winding side reel 6 is (m:n), the above described period square total computing operation becomes as follows.

$$m \cdot Ts^2 + n \cdot Tt^2 = K \tag{9}$$

Embodiment 2

Figure 16:
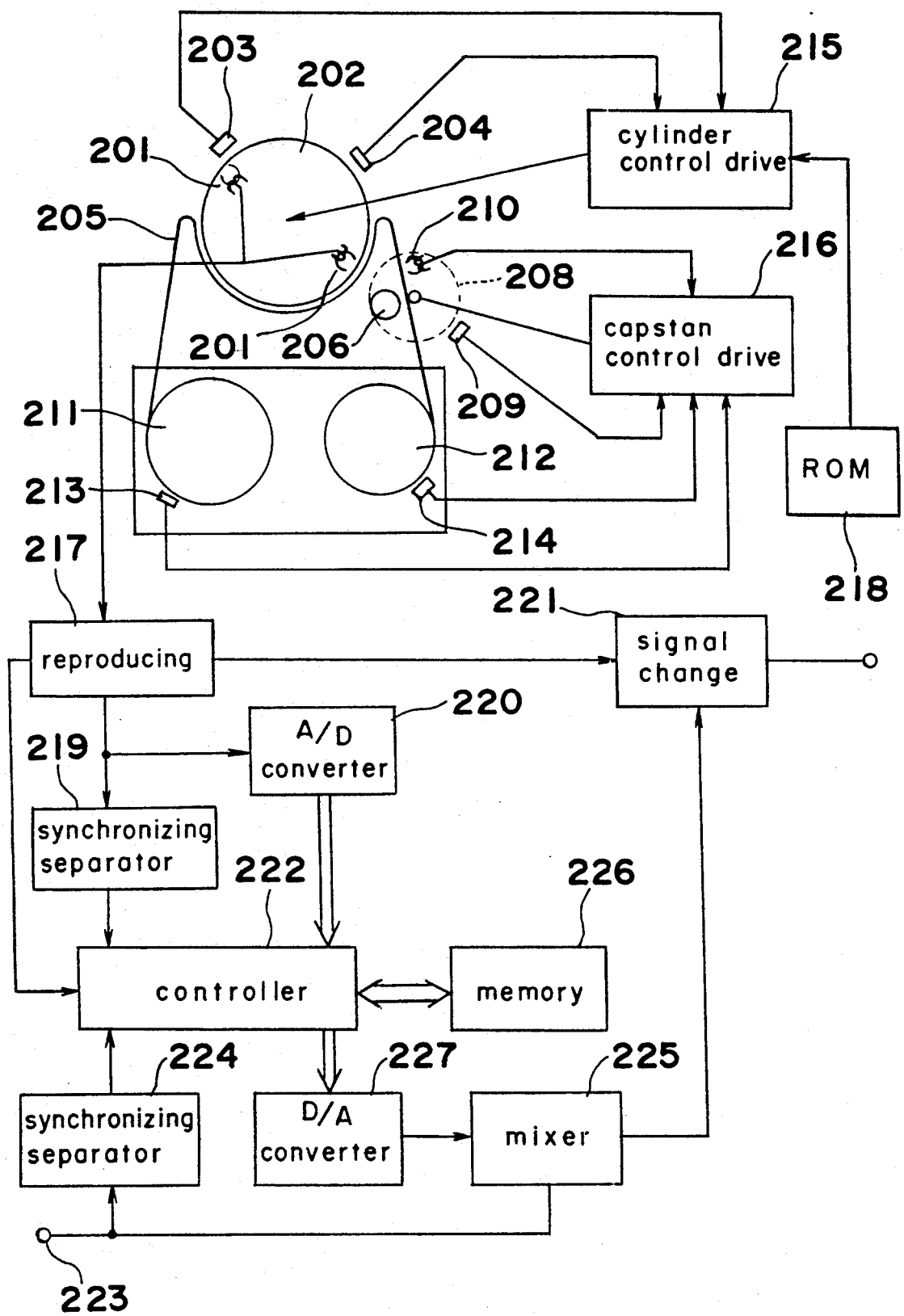
FIG. 16 is a block diagram of the overall construction of the second embodiment of the present invention.

FIG. 16 is a block diagram showing the construction of a picture signal processing apparatus in a second embodiment of the present invention.

In the present drawing, a rotary head 201 is mounted in a symmetrical position of a rotary cylinder 202. A speed detector 203, a phase detector 204 for detecting the the rotating speed are provided near the rotating cylinder 202. The magnetic tape 205 is drawn out of the tape cassette, and is controlled in the running speed by the pinch roller 206 and the capstan 207. Reference numeral 208 is a capstan motor, whose rotating speed is detected by the speed detector 209. A control head 210 is provided adjacent to the running route of the magnetic tape 205. A supply side reel 211 and a winding side reel 212 are provided within the tape cassette, with speed detectors 213, 214 being provided respectively on the sides thereof. The rotating cylinder 212 is controlled by a cylinder controlling·driving circuit 215 for controlling the rotating speed of the cylinder with the signals from the speed detector 203 and the phase detector 204. The capstan motor 218 is controlled in its rotating speed by the signals from the speed detector 209, the control head 210, and the signals from the speed detectors 213, 214. The signals from the rotary head 201 are outputted externally through a reproducing circuit 217.

In the present embodiment, a read only memory 218 (ROM) for retaining the reference numeral for correcting the relative speed is connected with a cylinder controlling·driving circuit 215. The reproducing signals to be obtained from the reproducing circuit 217 are given to a first synchronous detaching circuit 219, an A/D converter 220 and a signal switching circuit 221. The synchronous detaching circuit 219 detaches the horizon synchronizing signal of the reproducing signal, with the outputs thereof being given to a controlling portion 222. The reproducing circuit 217 feeds to a controlling portion 222 as a vertical reference signal V a switching signal for switching the outputs of two rotation heads 201. The picture signal processing apparatus has an input terminal 223 to which the second picture signal is given from the tuner and so on. The input terminal 223 is connected with the input ends of the second synchronous detaching circuit 224 and mixing circuit 225. The synchronous detaching circuit 224 is adapted to detach the horizontal and vertical synchronizing signal of the second picture signal, with the output thereof being given to the control portion 222. The A/D converter 220 is adapted to convert into digital signals the reproducing signals to be obtained from the reproducing circuit 217. The outputs thereof are given to the memory 226 through the control portion 222. A memory 226 is adapted to store the digital signals to be obtained from the A/D converter 220 by a control pulse to be given from the controlling portion 222, and to read the signals so as to feed it to the D/A converter 227 through the controlling portion 222. The D/A converter 227 converts the signal into the analog signal so as to feed it into the mixing circuit 225. The mixing circuit 225 is adapted to pile on the synchronizing signal of the second image signal the picture signals to be obtained from the D/A converter 227 so as to feed it to the signal switching circuit 221, as a composite video signal. The signal switching circuit 221 switches the signal between the reproducing circuit 217 and the mixing circuit 225 so as to output the reproducing signal to the monitor not shown.

Figure 17:
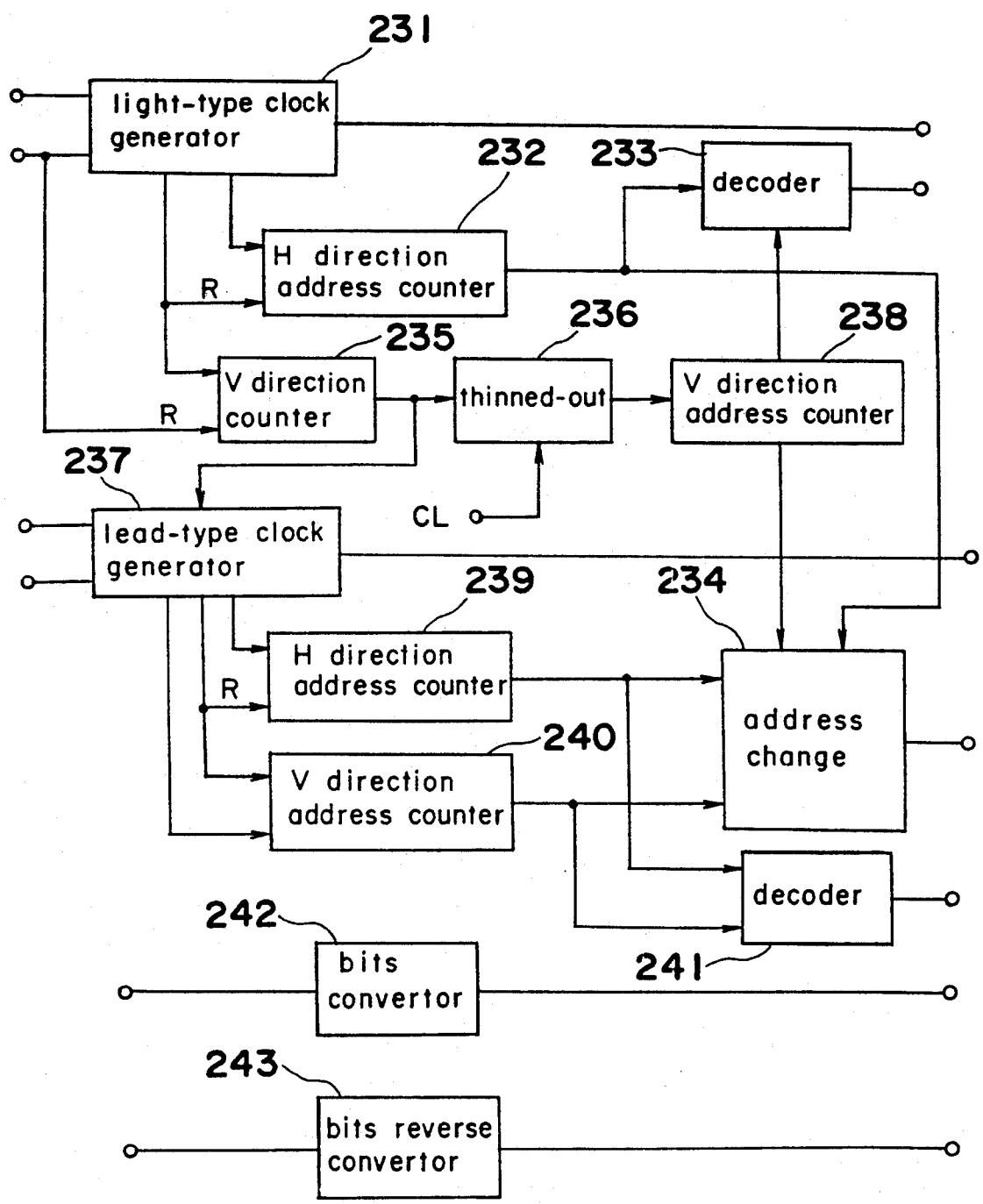
FIG. 17 is a block diagram showing the detailed construction of the control portion in the present embodiment.

FIG. 17 is a block diagram showing the detailed construction of the control portion 222. In the present drawing, the clock generator 231 has the horizontal synchronizing signal H to be separated from the synchronous detaching circuit 219 and the switching signal (vertical synchronizing signal V) to be given from the reproducing circuit 217 inputted to it so as to generate the pulses (RAS, CAS, DT, WE and so on) to control the memory 226 in accordance with theses signals, and outputs the clock signal and the horizontal synchronizing signal for operating the address counter. A first H direction address counter 232 is a counter on a write side for counting the clock of a frequency such as 13.5 MHz or 14.3 MHz equivalent to the sampling number of one horizontal scanning line to be retained in the memory 226, and adapted to be reset with the horizontal synchronizing signal, with the outputs thereof being fed into a decoder 233 and an address converting circuit 234. A V direction counter 235 is a counter for counting the horizontal synchronizing signals so as to be reset with a switching signal of the head. The frequency of the resetting signal becomes 60 Hz at the normal reproducing time, and becomes higher, for example, 95 Hz, than at the fast forwarding reproduction time because of the relative speed correction with the tape, and becomes lower, for example, 24 Hz at the rewinding reproduction time. The output of the V direction counter 235 is given to a thinning circuit 236 and a lead system clock generator 237. The thinning circuit 236 thins out the pulses of the source clock signal of 15.75 KHz in accordance with the digital values of the V direction counter 235 so as to feed them into a first V direction address counter 238, so that the writing start position into the memory 226 and the thinning out position are decided. The V direction address counter 238 is a counter on a write side for counting the clocks from the thinning circuit 236 so as to generate the address in the vertical direction of the memory 226, so that the output is fed into the decoder 233 and the address switching circuit 234. The decoder 233 is adapted to generate clamp pulses for removing burst signals with respect to the input signals of the A/D converter, and the signals for clamping the input signals.

A lead system clock generator 237 inputs the second horizontal and vertical synchronizing signal outputted from the synchronous detaching circuit 224, the source clock, and the digital output of the V direction counter 235 so as to generate pulses (SC, SOE and so on) for controlling the memory, and generates the clock signal and the horizontal synchronizing signal for operating the H direction address counter 239 and V direction address counter 240. The H direction address counter 239 is a counter which is adapted to count the clocks of the frequency equivalent to the sampling number of one horizontal scanning line, and is reset with the horizontal synchronizing signals, so that the outputs thereof are fed into the address switching circuit 234 and a decoder 241. The V direction address counter 240 is a counter for counting the horizontal synchronizing signals and outputting the address for the vertical direction use of the memory 226, so that the outputs thereof are fed into the address switching 234 and the decoder 241. The decoder 241 is adapted to generate a pulse for switching the output signal from the memory 226 and the second picture input signal, and the clamp pulse for making theses signals the same in potential. The address switching circuit 234 is adapted to switch the addresses of the memory 226 at the writing and reading time of the memory.

The outputs of the A/D converter 220 is adapted to be fed into the bit convertor 242. The bit converter 242 is adapted to convert the bit construction of the fed digital signal so as to transmit it into the memory 226. The signal read from the memory 226 is fed into the bit reverse converter 243, the bit construction is reversely converted and is transferred into the D/A converter 227.

The operation in the present embodiment will be described hereinafter. The same operation as in the conventional embodiment is effected at the normal operating time. The signal switching circuit 221 outputs the signals, as they are, from the reproducing circuit 217. At the high speed running, the pinch roller 206 and the capstan 207 are separated from each other so as to rotate the capstan motor 208 at the high speed, so that the magnetic tape 205 is wound at high speeds around the supply side reel or the winding side reel 212. In this case, the signals obtained from the speed detectors 213, 214 are inputted into the capstan controlling-driving circuit 216 so as to control the capstan motor 208 so that the tape running speed of the magnetic tape 205 may become constant. The relative speed of the cylinder 202 and the magnetic tape 205 are read from the ROM 218 so as to compare the signals of the speed detector 203, the phase detector 204 so that the horizontal feedback period of the reproducing signal may become the same at the normal reproducing time. The rotating speed of the cylinder 202 is controlled by the cylinder control the driving circuit 215 for conformity with the value of the ROM 218. The horizontal feedback period may be retained the same at the normal reproduction by the relative speed correction of the cylinder 202 and the magnetic tape 205 even at the high speed running time.

In a condition controlled in this manner, the signal to be obtained from the rotary head 201 is reproduced by the reproducing circuit 217. One portion of the reproducing signal is fed into the synchronous detaching circuit 219. The horizontal synchronizing signal is separated and is fed into the control portion 222. The second picture signal of the tuner or the like is separated by the synchronous detaching circuit 224 so as to give the vertical-horizontal synchronizing signal to the control portion 222. At the writing time into the memory 226, the clocks generated by the write system clock generator 231 are counted by the H direction address counter 232 so as to feed the H direction address into the address switching circuit 234 by the resetting operation for each horizontal synchronizing signal. The V direction counter 235 is also counted up for each horizontal synchronizing signal so as to effect the resetting operation for each variation in the switching signal of the head. As the cylinder 202 is effecting the relative speed correcting operation, the rotating speed of the cylinder 202 becomes higher than in the normal rotating speed in the case of the fast forwarding operation, and becomes as high as, for example, 95 Hz in the frequency of the switching signal of the head. The digital value of the V direction counter 235 is less than the number of the normal horizontal scanning lines, and is the repetition counting operation of, for example, 0 through 165. In the case of the rewinding, the rotating speed of the cylinder 202 becomes lower than the normal rotating speed, and the frequency of the switching signal of the head becomes as low as, for example, 24 Hz. The V direction counter is larger in the digital value than in the normal case, and is to count, for example, 0 through 656 repetitively. The thinning circuit 236 thins out the pulses of the clock of 15.759 Hz which is a source clock in accordance with the digital value of the V direction counter and the displaying size so as to feed it into the V direction address counter, so that the maximum digital value of the V direction address counter is retained to become 262 or less. The number of the thinning lines is decided by the thinning circuit 236 in accordance with the digital value of the V direction counter 235 and the displaying size so as to generate clocks for operating the V direction address counter 238. The image face may be contracted in the vertical direction by the controlling operation of the V direction address at the writing time of the memory 224. For example, all the inputs have only to be memorized even at 1 or ¼ image face display when the running direction of the tape is in the fast forwarding direction. But when the running direction of the tape is in the rewinding direction, the number of the thinning lines becomes different between the 1 image display and the ¼ image display.

The operation in the case of reading the signals from the memory 226 will be described hereinafter. The lead system clock generator 237 generates the control signals of the H direction address counter 239, the V direction address counter 240, and the memory by the horizontal-vertical synchronizing signals of the second picture signal and the source clocks. The H direction address counter 239 counts up with a clock made by the input clocks and is reset for each of the horizontal synchronizing signals. The clock changes by the displaying size. In the displaying of, for example, the whole one image face, the clock of the H direction of the write system and the lead system becomes the same. In the case of displaying of the ¼ image face, the frequency of the lead system clock becomes twice as many as the write system clock. The V direction address counter 240 counts up for each of the horizontal synchronizing signals. When the running direction of the tape is in the fast forwarding direction, the number of the lines within one vertical period becomes less than in the normal reproduction case as the rotating period of the rotary cylinder 202 becomes short. In the lead system clock generator 237, the counting of the V direction address counter 240 is stopped when the maximum counting value of the V direction counter 235 has been reached. The clock of the D/A converter 227 and the signal of the mixing circuit 225 are switched by the decoder 241 so as to compose and output the signal. The address switching circuit 234 switches the respective addresses for each mode so as to output them into the memory 226. The reproducing signal which has been converted into the digital data by the A/D converter 220 is switched in the bit construction by the bit converter 242 of the controlling portion 222, is inputted into the memory 226 by the selected address and the control signal. It is outputted from the memory 226 by the address which has been switched to each control signal made by the lead system and is outputted into the D/A converter 227 through the bit reverse converting circuit 43. The D/A converter 227 converts the digital data into the analog signal so as to compose the synchronizing signal of the second picture signal, so that a reproducing signal is piled into a certain signal of the normal synchronizing signal, and is switched by the signal switching circuit 221 so as to output into the television image face. The image face may be normally displayed on the monitor without flowing even at the fast forwarding reproduction and the rewinding reproduction.

The present embodiment shows the reproducing signal being piled up in the second picture signal. The synchronizing signal may be made within the controlling portion 222 and may be added to the reproducing signal. Although the V direction correction is realized by the controlling of the address, it may be realized even by the line interpolation of the data.

Embodiment 3

Figure 18:
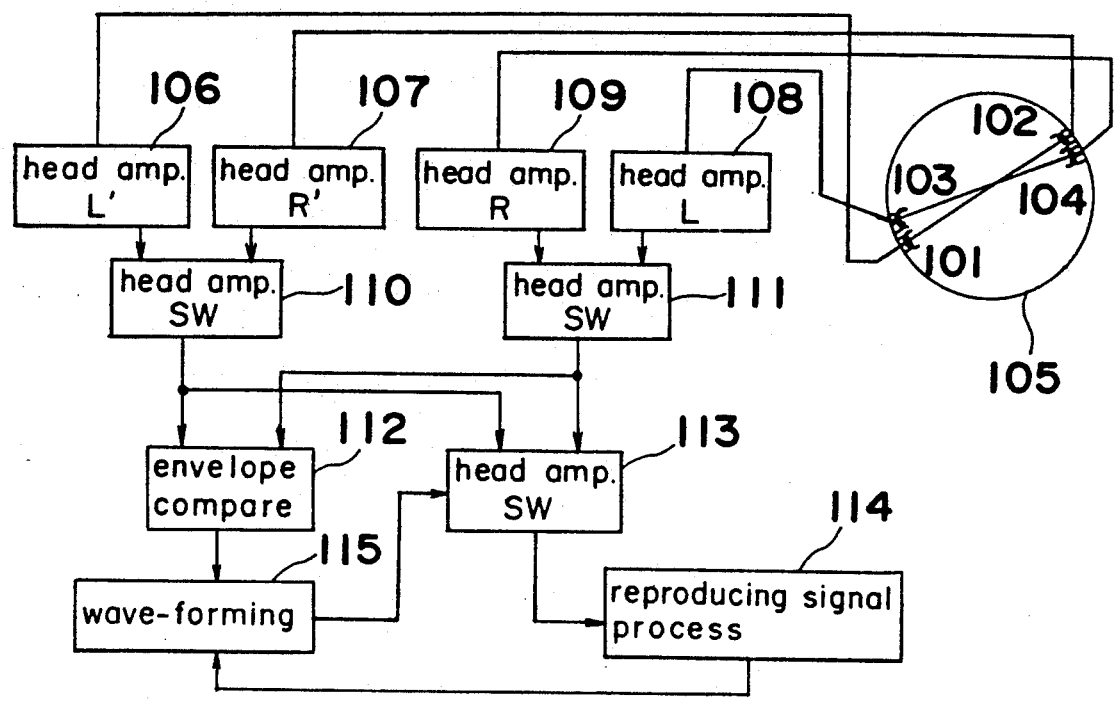
FIG. 18 is a block diagram showing the construction of the waveform forming apparatus in a third embodiment of the present invention.
Figure 19:
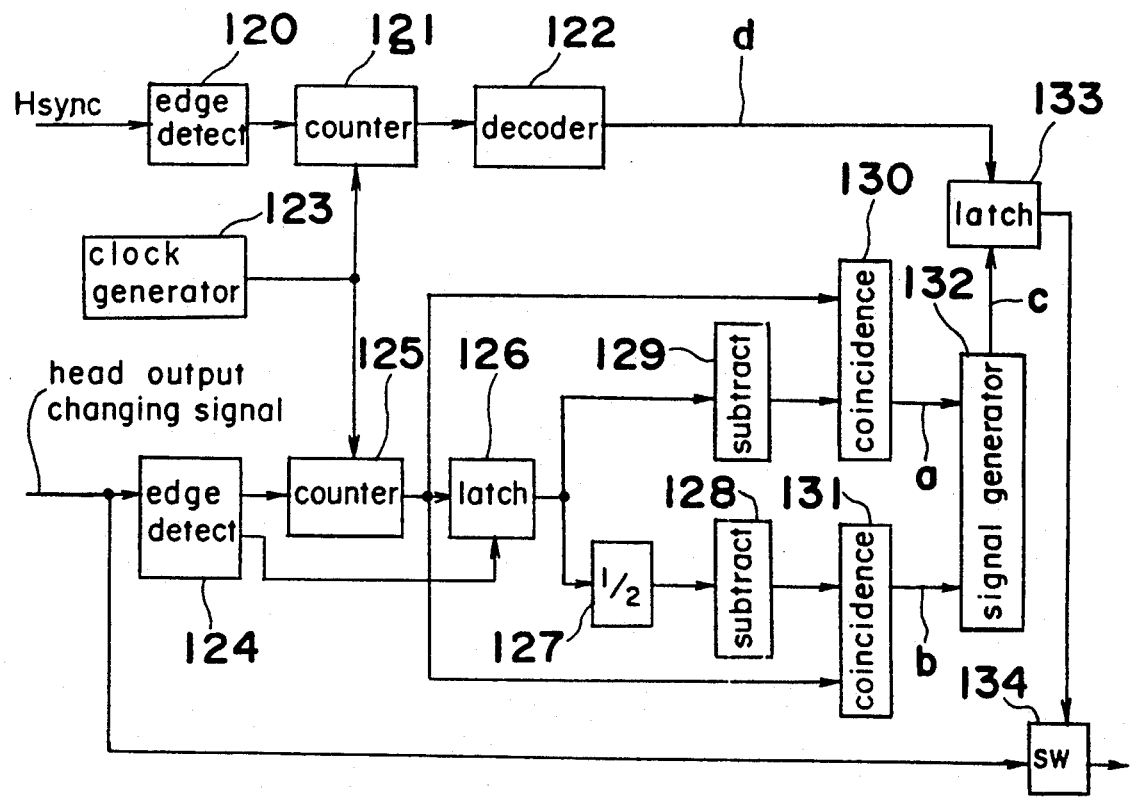
FIG. 19 is a block diagram showing the construction of the waveform forming circuit thereof.
Figure 20:
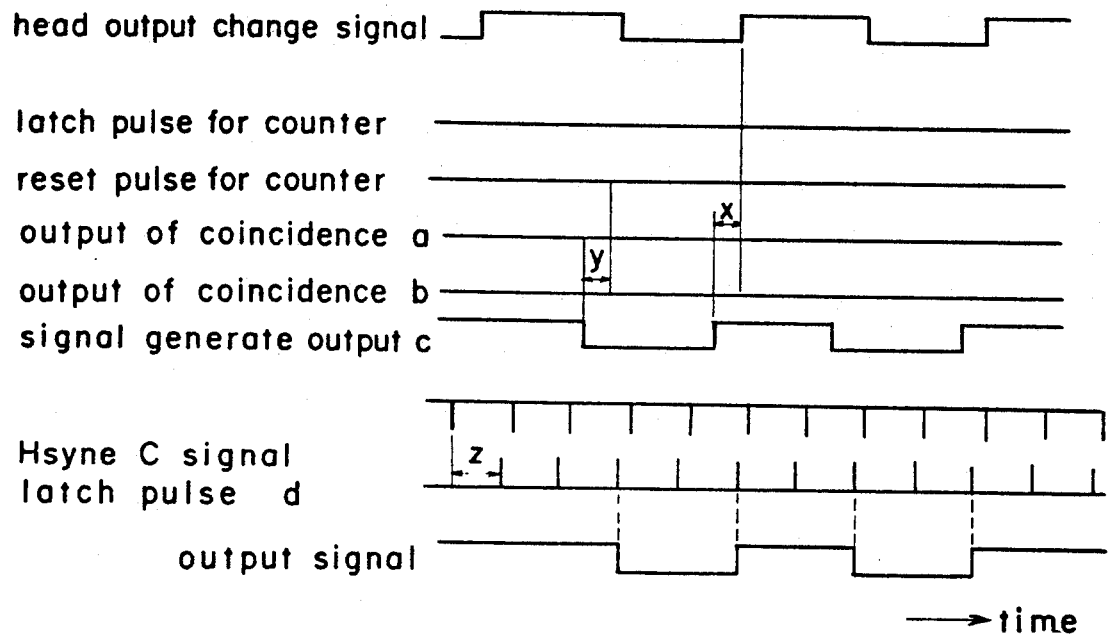
FIG. 20 is a timing chart of the waveform forming circuit essential portions thereof.
Figure 21:
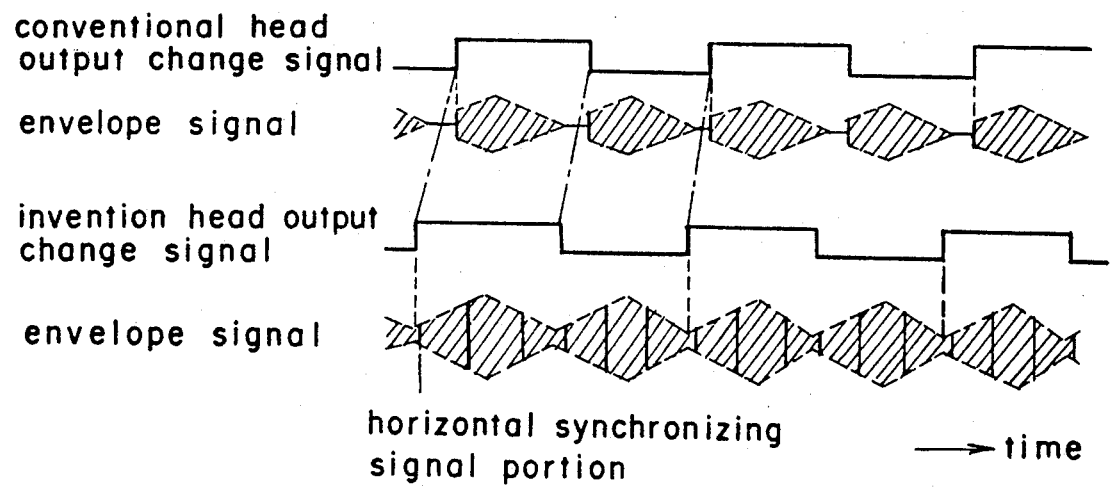
FIG. 21 is a timing chart showing the effects of the present invention.

FIG. 18 is a block diagram showing the construction of a waveform forming apparatus in a third embodiment of the present invention. FIG. 19 is a block diagram showing the detailed construction of the waveform forming circuit 115. FIG. 20 shows a timing chart of the essential portions of a waveform forming circuit 115. In FIG. 18, the like portions as those of the conventional embodiment are designated by like reference characters so as to omit the detailed description. Even in the present embodiment, a rotary head L'101, a rotary head R'102, and a rotary head L103, a rotary head R104 are respectively mounted in the symmetrical positions of the rotary cylinder 105. A rotary head L'101 and a rotary head L103, and a rotary head R'102 and a rotary head R104 are mounted in adjacent relation. The rotary head L'101 is connected with a head amplifier L'106. The rotary head R'102 is connected with a head amplifier R'107. The rotary head L103 is connected with a head amplifier L108. The rotary head R104 is connected with a head amplifier R109. A head amplifier L'106 and a head amplifier R'107 are connected with a head SW circuit 110. The head amplifier L108 and the head amplifier R109 are connected with the head SW circuit 111. The heads SW circuits 110, 111 are connected with a head amplifier SW circuit 113 and an envelope comparing circuit 112, switch the output signal from the head SW circuits 110, 111 in the head amplifier SW circuit 113 so as to feed the amplified signal to a reproduction signal processing circuit 114.

In the present embodiment, a waveform forming circuit 115 is connected between an envelope comparing circuit 112 and a head amplifier SW circuit 113. The signals are fed from the reproducing signal processing circuit, 114 to the waveform forming circuit 115. In the waveform forming circuit 115 of FIG. 19, the rising or the falling edge of the horizontal synchronizing signal is detected so as to generate the reset pulses of the counter 121 of a rear stage by an edge detecting circuit 120. The output of the counter 121 is fed into the decoder 122 so as to generate the pulses of latch use. The clock generating circuit 123 generates the clocks for the respective counters 121, 125. The rising or falling edges of the head output switching signal is detected so as to generate the reset pulses for the counter use of the rear stage and the pulses for the latch use by the edge detecting circuit 124. The output of the counter 125 is inputted into the latch 126 and the coincidence circuits 130, 131. The values of the counter 125 retained by the latch 126 are fed into a subtracting circuit 129 and a ½ circuit 127. The ½ circuit 127 halves the inputted value so as to subtract the constant value from the half value inputted. The coincidence circuits 130, 131 discriminate whether or not the output value from the respective subtracting circuits 128, 129 agree with the value from the counter 125. When they have agreed with each other respectively, the coincidence pulse is outputted. The signal generating circuit 132 sets (or resets) the output signal with the pulses from the coincidence circuit 130 so as to effect the reset (or set) operation with the pulses from the coincidence circuit 131. The latch 133 latches the signals outputted from the signal generating circuit 132. In the SW 134, the output signals from the envelop comparing circuit 112 and the outputs from the latch 133 are switched.

The operation in the present embodiment will be described hereinafter. In the case of the normal reproduction, the fast forwarding reproduction, and the rewinding production, an operation that is the same as the conventional embodiment is effected. The SW 134 within the waveform forming circuit 115 switches the signals from the head SW circuits 110, 111 by the head amplifier SW circuit 113 in accordance with the head output switching signals from the envelope comparing circuit 112. In the high speed running, the SW 134 within the waveform forming circuit 115 is switched so that the head amplifier SW circuit 113 is adapted to be controlled by the output formed by the waveform forming circuit 115. In the edge detecting circuit 124 within the waveform forming circuit 115, the rising edge of the head output switching signal outputted from the envelop comparing circuit 112 is detected so as to output a pulse for resetting the counter 125 and a pulse for latching the outputted counter value. The clock generating circuit 123 generates clocks for operating the counter 125 and the counter 121. As described in FIG. 20, the edge detecting circuit 124 outputs pulses for resetting the counter 125 after outputting the pulses for latching the output of the counter 125. The value of the counter 125 is reset by the resetting pulses from the edge detecting circuit 124 after the value of the counter 125 being latched by the latch 126. The counter 125 is reset by the rising of the head output switching signal. The constant value (value of x of timing chart) is subtracted from the latched counter value by the subtracting circuit 129. It discriminates whether or not the value subtracted by the coincidence circuit 130 agrees with the counter value so as to output the coincidence pulse. Namely, if the value where the constant value has subtracted from the counter value before one horizontal scanning operation is equal to the present counter value, the coincident pulse (a coincidence circuit output a of the timing chart) is outputted. Similarly, the latched counter value becomes the half value thereof by the ½ circuit 127, further the constant value (the value of the y of the timing chart) is subtracted by the subtracting circuit 128 so as to discriminate whether or not the value subtracted by the coincidence circuit 131 agrees with the counter value so as to output the coincidence pulse (the coincidence circuit output b of the timing chart). The signal generating circuit 132 inputs these two coincidence pulses so as to output the formed head output switching signal (the signal generating output c of the timing chart). Namely, a signal which is shifted ahead by a constant value x with respect to the rising of the head output switching signal of the input of the waveform forming circuit and is shifted ahead by the constant value y only with respect to the time of the half period of the head output switching signal is formed. The rising edge of the horizontal synchronizing signal (the wave form of Hsync of the timing chart) which has been inputted from the reproducing signal processing circuit 115 by the edge detecting circuit 120 so as to output the pulses for resetting the counter 121. The counter 121 effects the resetting operation for each of the horizontal synchronizing signal. The decoder 122 produces the pulse (the c signal latch pulse of the timing chart) to be outputted after the constant time period (the delay time of the z of the timing chart) from the horizontal synchronizing signal). The signal (the signal generating signal c of the timing chart) which has been outputted from the above described signal generating circuit 132 by the above described latch pulse is latched by the latch circuit 133. The head output is adapted not to be switched near the horizontal synchronizing signal in this manner.

According the waveform forming apparatus in the embodiment of the present invention, the head output may be prevented from being lacked in the high speed tape running time as the head output switch timing is adapted to proceed with the use of the head output switching signal before one cycle.

In the present embodiment, the falling may be used although the rising of the input signal is used. Although the wave form is formed from the rising edge only of the head output switching signal, the processing operation may be effected with the use of both the raising and falling edges. In this case, the latching circuit 126 becomes two, thus removing the ½ circuit 127.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A capstan controlling apparatus comprising:
   a capstan;
   a first frequency generator for generating a first rotation detecting signal having a period which varies in accordance with a rotating speed of said capstan;
   a supply side reel;
   a second frequency generator for generating a second rotation detecting signal having a period which varies in accordance with a rotating speed of said supply side reel;
   a winding side reel;
   a third frequency generator for generating a third rotation detecting signal having a period which varies in accordance with a rotating speed of said winding side reel;
   a capstan drive circuit for driving said capstan;
   a capstan speed comparison circuit including means for quantitating and summing the periods of said second and third detecting signals and for comparing a thus obtained sum with a total sum of reference periods of said second and third detecting signals to obtain a comparison result, means for modulating a reference period of said first detecting signal with said comparison result to obtain a modulated result, and means for quantitating the period of said first reference signal and for generating an error in accordance with the quantitated period of said first reference signal and said modulated result; and,
   means for controlling said capstan drive circuit in accordance with said error generated by said capstan speed comparison circuit.

2. A capstan controlling apparatus as claimed in claim 1, further comprising means for changing said total sum of reference periods in accordance with a length of a tape wound around said supply side reel and said winding side reel.

3. A capstan controlling apparatus comprising:
a capstan;
a first frequency generator for generating a first rotation detecting signal having a period which varies in accordance with a rotating speed of said capstan;
a supply side reel;
a second frequency generator for generating a second rotation detecting signal having a period which varies in accordance with a rotating speed of said supply side reel;
a winding side reel;
a third frequency generator for generating a third rotation detecting signal having a period which varies in accordance with a rotating speed of said winding side reel;
a capstan drive circuit for driving said capstan;
a capstan speed comparison circuit including means for quantitating and summing the squares of periods of said second and third detecting signals and for comparing a thus obtained sum of squares with a total sum of squares of reference periods of said second and third detecting signals to obtain a comparison result, means for modulating a reference period of said first detecting signal with said comparison result to obtain a modulated result, and means for quantitating the period of said first reference signal and for generating an error in accordance with the quantitated period of said first reference signal and said modulated result; and,
means for controlling said capstan drive circuit in accordance with said error generated by said capstan speed comparison circuit.

4. A capstan controlling apparatus as claimed in claim 3, further comprising means for changing said total sum of squares of reference periods in accordance with a length of a tape wound around said supply side reel and said winding side reel.

* * * * *